United States Patent
Ruggaber et al.

(10) Patent No.: US 8,336,701 B2
(45) Date of Patent: Dec. 25, 2012

(54) SKID FOR SUPPORTING AN OBJECT, AND TRANSFER STATION, DRIVE UNIT, DRIVE SYSTEM AND CONVEYOR INSTALLATION FOR SUCH SKIDS

(75) Inventors: Thomas Ruggaber, Reutlingen (DE); Joerg Robbin, Ammerbuch (DE)

(73) Assignee: Eisenmann AG (DE)

( * ) Notice: Subject to any disclaimer, the term of this patent is extended or adjusted under 35 U.S.C. 154(b) by 444 days.

(21) Appl. No.: 12/100,745

(22) Filed: Apr. 10, 2008

(65) Prior Publication Data
US 2008/0251354 A1 Oct. 16, 2008

(30) Foreign Application Priority Data

Apr. 13, 2007 (DE) .......................... 10 2007 017 511

(51) Int. Cl.
*B65G 35/06* (2006.01)
(52) U.S. Cl. .............. 198/345.3; 198/867.01; 198/465.1
(58) Field of Classification Search .... 198/345.2–345.3, 198/867.01, 867.11–867.15, 465.1
See application file for complete search history.

(56) References Cited

U.S. PATENT DOCUMENTS

| | | | |
|---|---|---|---|
| 3,518,946 A | | 7/1970 | Kavieff |
| 4,548,135 A | * | 10/1985 | Kupczyk ...................... 104/135 |
| 5,368,152 A | * | 11/1994 | Rhodes ....................... 198/465.1 |
| 5,509,159 A | * | 4/1996 | Du-Bois ............................ 5/627 |
| 5,987,673 A | * | 11/1999 | Smith ................................. 5/627 |
| 6,203,085 B1 | * | 3/2001 | Ferris ............................... 296/20 |
| 6,324,992 B1 | * | 12/2001 | Morikiyo et al. ........... 104/172.3 |
| 6,494,304 B1 | | 12/2002 | Jaynes et al. |
| 6,540,064 B1 | * | 4/2003 | Bodewes et al. ........... 198/465.1 |
| 6,681,424 B1 | * | 1/2004 | Bourgraf et al. .................. 5/611 |
| 2001/0020572 A1 | * | 9/2001 | Koegler ..................... 198/867.14 |
| 2003/0042113 A1 | * | 3/2003 | Kasagi ....................... 198/465.1 |
| 2003/0150697 A1 | | 8/2003 | Swoboda |

FOREIGN PATENT DOCUMENTS

| DE | 1903645 A1 | 9/1996 |
|---|---|---|
| DE | 10205991 A1 | 8/2003 |

* cited by examiner

*Primary Examiner* — Mark A Deuble
(74) *Attorney, Agent, or Firm* — Factor Intellectual Property Law Group, Ltd.

(57) ABSTRACT

A skid for supporting at least one object which is conveyable in a conveying direction inside a conveyor installation comprises at least two support runners disposed parallel to one another. Running means different from the support runners are fastened to the skid. In addition, a transfer station for transferring an above-mentioned skid from conveying means to a guide structure is specified. Also specified are a self-propelling drive unit with a chassis and a coupling device by means of which a skid can be coupled detachably to the chassis, a drive system for driving a skid and a conveyor installation, in which a drive unit is provided inside a conveying area.

9 Claims, 19 Drawing Sheets

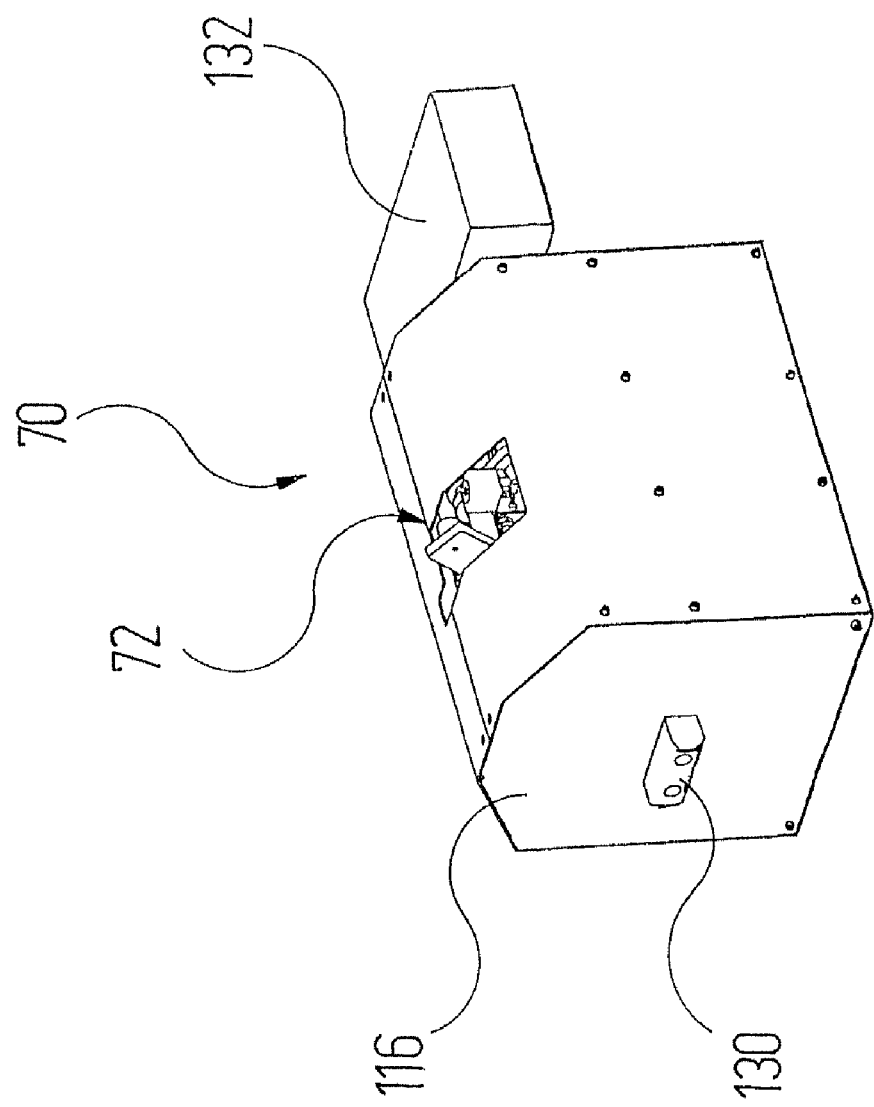

SKID FOR SUPPORTING AN OBJECT, AND TRANSFER STATION, DRIVE UNIT, DRIVE SYSTEM AND CONVEYOR INSTALLATION FOR SUCH SKIDS

CROSS-REFERENCE TO RELATED APPLICATIONS

This application claims the filing benefit of German Patent Application No. 10 2007 017 511.8, filed on Apr. 13, 2007, the contents of which are incorporated herein by reference.

TECHNICAL FIELD

The invention relates to a skid for supporting at least one object, in particular a vehicle body, which is conveyable in a conveying direction within a conveyor installation, which skid has at least two support runners disposed parallel to one another.

BACKGROUND OF THE INVENTION

Skids of this type are used, in particular in the automotive industry, for transporting vehicle bodies between, and partially in, individual processing or treatment stations within a conveyor installation. The support runners of the skid cooperate with conveyor means, for example a belt conveyor or a roller conveyor.

In such a conveyor installation it can happen that up to 400 or more vehicle bodies are conveyed at the same time. In order to drive said bodies a large number of drive units, i.e., as a rule, electric motors, are necessary.

To ensure a uniform throughput through the installation, buffer areas are often provided, within which skids loaded or not loaded with vehicle bodies are temporarily parked.

Usually, the conveying means inside such a buffer area correspond to the conveying means of a conveying area which connects processing or treatment stations.

The roller conveyors mentioned above, as already used in conveyor installations, usually comprise parallel steel profiles in which are recessed rollers on which the support runners of the skid rest. For conveying the skid on the roller conveyor, a plurality of the rollers are driven.

In total, in roller conveyors and in other known conveying means for conveying skids, a comparatively large quantity of steel is employed. This increases the total cost of such a conveyor installation.

The above-mentioned high number of necessary drive units, which in a conveyor installation of usual size can amount to approximately 1200, also ensures high investment costs.

Skids of the type mentioned in the introduction have the disadvantage that their support runners can cooperate only with conveying means which must include an appropriately large number of drive units for this purpose. If an existing installation is to be enlarged or modified, it is necessary that the conveying means to be incorporated at that time correspond to those of the existing installation. Alternative conveying means which require less material and/or fewer drives cannot be used.

In addition, conveying means frequently also form a guide structure for a skid. This is the case, for example, with a roller conveyor. However, as already mentioned, a roller conveyor is very complex and costly in construction. Nevertheless, there may be regions in a conveyor installation in which a more simply configured guide structure could be used, if the skid was not restricted to a single guide structure.

The present invention is directed to addressing these and other issues.

SUMMARY OF THE INVENTION

It is an object of the invention to provide a skid which is variable and can cooperate with conveying means and/or guide structures of differently constructional configurations. In conjunction with this object, devices are desirable by means of which such a skid can also be used in an existing conveying installation, while utilising the possibilities of said skid. In general, there is a requirement for a conveying installation in which different conveying means and/or guide structures, adapted in each case to a particular area of use, can cooperate with a skid.

This object may be achieved with a skid of the type mentioned in the introduction, in that running means different from the support runners are fastened to the skid.

The possibility is thereby provided that the skid can cooperate, firstly, by means of its support runners with conveying means and/or a guide structure of a first type, and, by means of running means different from said first type, with conveying means and/or a guide structure of a second type.

Advantageous developments of the skid are specified throughout this patent application.

If the running means are arranged below the support runners in operation, the possibility advantageously exists of combining with one another two conveying means which transport the skid at different conveying levels. A sometimes necessary guide structure which cooperates with the running means may, for example, be mounted on the floor of the conveyor installation or may be formed by the floor itself.

In this case it is advantageous if the running means are adjustable between a rest position and an operating position. When the running means occupy their rest position, the skid can be conveyed in known fashion on its support runners without interfering with the running means. When the running means occupy their operating position, the skid can be conveyed by means of the running means adapted to the conveying means.

It is especially advantageous if the running means are configured as a plurality of running wheels on which the skid is movable. By means of running wheels, the skid can be conveyed either in a freely mobile manner or by means of a rail system. In particular, the skid can be moved over the floor of the conveyor installation by means of the running wheels.

For the adjustability of the running wheels between a rest position and an operating position it is advantageous if each running wheel is mounted to an end region of a pivoted member which is mounted swivellably by its opposite end region to the skid. In this case it is especially advantageous if the pivoted member is mounted swivellably on the skid about an axis running perpendicularly to the conveying direction and parallel to a plane defined by the support runners. Alternatively, it is possible that the pivoted member is swivellable about an axis which runs parallel to the conveying direction.

With regard to an externally-induced swivelling movement between the rest position and the operating position of a running wheel, it is advantageous if at least one running gear assembly is provided which has two pivoted members, each with an associated running wheel, the two pivoted members of the running gear assembly being rigidly connected to one another. In particular, the two pivoted members are arranged side-by-side in a direction perpendicular to the conveying direction. As a result of the connection of the two pivoted members to one another, it is sufficient if one of the pivoted members is moved in order to change it from its rest position to its operating position or vice versa, because the other pivoted member automatically follows the movement of the first pivoted member as a result of the rigid connection.

If the axle of at least one running wheel is rotatable in its operating position about an axis which is disposed perpendicularly to a plane defined by the support runners, the skid is advantageously also able to travel around curves. Shunting operations are facilitated thereby.

For safe operation of the skid, it is helpful if at least one latching device for at least one running wheel is provided, by means of which the corresponding running wheel can be locked selectively in its rest position or its operating position.

In order to economise with drive units, it is advantageous if a part of a coupling device is provided at each end of the skid, viewed in the conveying direction, so that a plurality of skids can be connected detachably to form a combination in which the skids are arranged one behind another, viewed in the conveying direction. In this way, it is possible for a plurality of coupled skids to be driven by means of a single drive. Drive units can potentially be saved in this way.

In order to take account of the basic concept of a skid which can cooperate with two differently configured conveying means and/or guide structures, a transfer station for a skid further forms part of the subject matter of the invention, which transfer station serves to transfer the skid from conveying means which cooperate with the support runners of the skid to a guide structure which cooperates with the running means of the skid. For example, the conveying means may be a roller conveyor of the type mentioned in the introduction, and the guide structure may be a rail system.

It is advantageous if the transfer station has support rollers over which the skid can be driven on its support runners. This configuration corresponds substantially to a roller conveyor, although driven rollers are dispensed with here.

For the interaction of the transfer station with a skid, it is advantageous if at least one adjustment device, by means of which the running means of the skid can be changed from a rest position to an operating position and vice versa, is provided at the transfer station. In this way the transfer station serves practically as an interface between a first type of conveying means which cooperates with the support runners of the skid, and another type of conveying means and/or a guide structure which cooperates with the running means of the skid in their operating position.

The subject matter of the invention further includes a drive unit for driving a skid, which drive unit is self-propelling and includes a chassis and a coupling device, by means of which the skid can be coupled detachably to the chassis of the drive unit. The skid can therefore be driven by means of the self-propelling drive unit. The self-propelling drive unit preferably cooperates with the skid according to the invention when the running means thereof occupy their operating position. However, the drive unit can also cooperate with a skid as known hitherto.

For better coordination and for control of the drive unit, it is advantageous if means for detecting the position of the drive unit are provided. If a corresponding drive unit is coupled to a skid, the position of the skid is also known.

Regarding the coupling of the drive unit to a skid, it is advantageous if the coupling device includes at least one catch element which cooperates with a retaining element of the skid. The retaining element of the skid is preferably a cross-member thereof against which the catch element of the coupling device abuts when the associated drive unit occupies a corresponding position with respect to the skid.

In this case it is advantageous if the catch element has a catch surface and is arranged on an axis of rotation parallel to the conveying direction, with its catch surface perpendicular in the conveying direction. In this way the catch element can be rotated about the axis of rotation so that the associated drive unit can also be moved past a skid without the latter being entrained by it. Shunting operations, in particular those in which drive units are moved without a skid, are thereby facilitated.

It is advantageous if the coupling device has a further catch element which is spaced from the first catch element in the conveying direction and is arranged on the axis of rotation with its catch surface in a plane parallel to the catch surface of the first catch element. This can be achieved, for example, by means of two plates arranged parallel to one another. In this case it is especially advantageous if the distance between the catch surfaces of the two catch elements is large enough for the retaining element of the skid to be accommodated between them. Taking as an example the cross-member already referred to, the latter would be accommodated between the two catch elements in a corresponding position thereof, whereby the skid can follow the drive unit in each direction, even in the event of a change of direction of the drive unit.

In order to realise a plurality of coupling variants, it is advantageous if the catch elements are arranged at an angle to one another such that they can be moved by rotation of the spindle into positions in which either neither of the catch elements, or one of the catch elements, can engage the retaining element of the skid, or both catch elements can engage the retaining element of the skid.

The subject matter of the invention further includes a drive system for driving a skid in which at least one drive unit, as explained above, is provided.

The drive unit can be configured in a freely mobile form, for which purpose suitable control and regulating technology is required. If the path guidance of the drive unit is to be ensured with less complexity and cost, it is advantageous if at least one guide rail on which the drive unit can be driven is provided. In this case the path on which the drive unit can move is predefined structurally.

In the case of a drive system of this type it is advantageous if it includes a plurality of individually controllable drive units. In this way different skids can be moved individually by one drive unit in each case. As referred to above, a plurality of skids connected to one another to form a combination can also be moved by one drive unit.

The subject matter of the invention further includes a conveyor installation for conveying skids, which includes at least one conveying area.

In a conveyor installation of this type the wish for greater flexibility mentioned in the introduction is taken account of in that: within the conveying area a drive unit according to the invention, as described above, is provided for conveying the skid.

In order to increase the flexibility of the conveyor installation still further, it is advantageous if the conveyor installation includes a shunting guide structure on which a drive unit can be driven even without skids coupled thereto. In this way a kind of shunting station can be realised with simple means.

It is also advantageous if the shunting guide structure is disposed between two areas of use of a drive unit. Two different areas of use may be, for example, two buffer areas at different locations which are connected to one another by the shunting guide structure. If, for example a shortage of drive units arises in one of these areas of use, one or more drive units can be transferred thereto from the other area of use.

For this purpose it is advantageous if the shunting guide structure is connected via a transverse conveying rail on which the drive unit can be driven to a guide rail on which the drive unit can be driven. In this way a technically complex and costly points system can be avoided.

It is advantageous, in particular for conveying an inventive skid as explained above, if a. conveying means which cooperate with the support runners of the skid are provided in a first conveying area;
b. a guide structure which cooperates with the running means of the skid is provided in a second conveying area, in particular a buffer area; and,
c. the conveyor installation includes at least one transfer station which connects the conveying means of the first conveying area to the guide structure of the second conveying area.

In this case the transfer station is a transfer station according to the invention, as explained above.

In the second conveying area a skid to be moved is preferably driven by means of an inventive drive unit as explained above.

Existing technologies are utilised in an advantageous manner if the conveying means in the first conveying area are in the form of roller conveyors.

In conveying installations for transporting and treating vehicle bodies there are frequently areas in which conditions prevail which cannot be tolerated by sensitive components. Such components include, for example, an above-mentioned drive unit. For this reason it is advantageous if at least one treatment station is provided in the conveyor installation in which a skid can be propelled by means of a drive system operating without the drive unit according to the invention. This drive system is preferably both independent of the drive unit or drive units in the second conveying area and independent of the conveying means in the first conveying area of the conveyor installation.

A favourable solution for this requirement is if the further drive system is a cable or chain traction drive with a catch element which cooperates with a retaining element of the skid. The retaining element may be the same retaining element of the skid which cooperates with the drive unit.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

FIG. 15 is a perspective representation of a freely mobile separate drive unit for moving the skid;

DETAILED DESCRIPTION OF THE INVENTION

Figure 1:
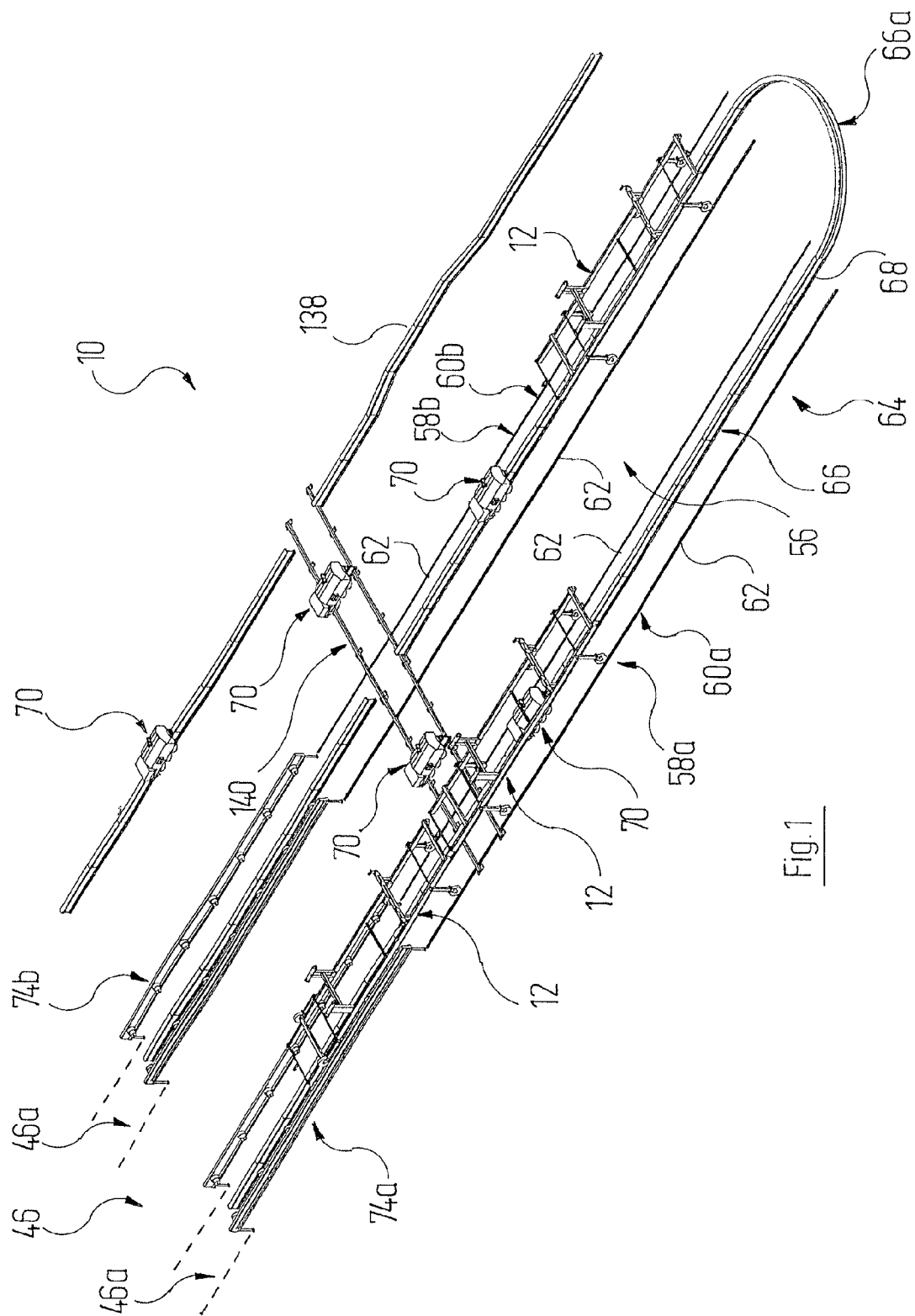
FIG. 1 is a perspective representation of a part of a conveyor installation including a number of functional areas, several skids and several separate drive units being shown.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

FIG. 1 shows a part of a conveyor installation, denoted as a whole by 10, by means of which vehicle bodies (not shown here) are transported between and partly inside individual processing or treatment stations, such as bodyshell, painting and assembly stations.

For this purpose each vehicle body is fastened to a transport frame 12, referred to hereinafter as a "skid", three skids 12 being shown in FIG. 1.

Figure 2:
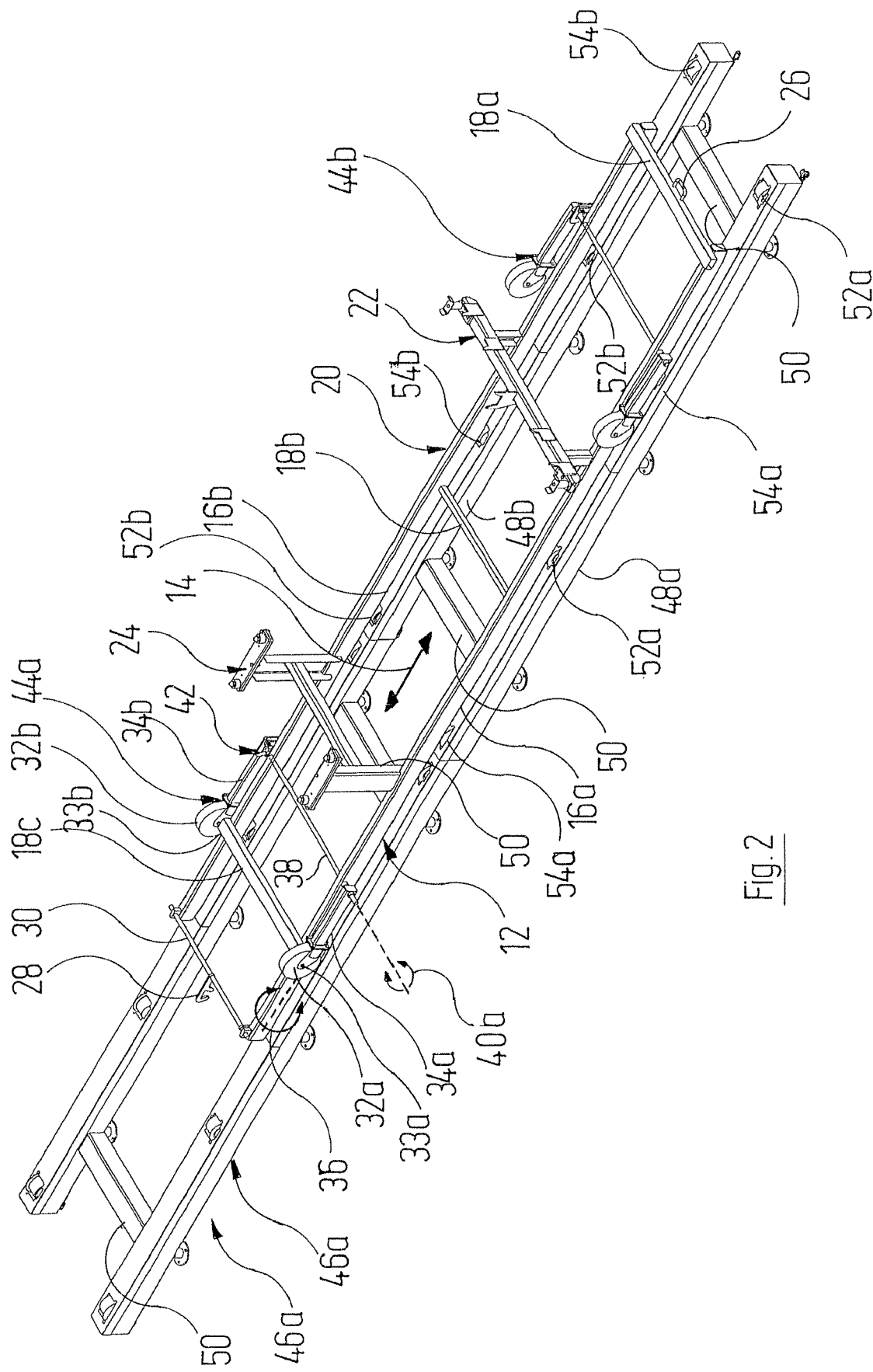
FIG. 2 is a perspective representation of a skid on a roller conveyor.

One of the skids 12 is shown on a larger scale in FIG. 2. The skid 12 comprises two support runners 16a, 16b disposed parallel to a longitudinal direction of the skid 12, indicated by a double arrow 14. These support runners 16a, 16b are configured as hollow-profile longitudinal members with a rectangular cross section. The function of the support runners 16a, 16b is explained in more detail below.

The support runners 16a, 16b are connected to one another by means of three cross-members 18a, 18b, 18c, also in the form of hollow profiles, whereby an overall frame structure of sufficient torsional stiffness is produced, which defines a support plane of the skid 12. This frame structure carries on its upper side two raised assembly structures 22, 24 to which a vehicle body to be conveyed can be fastened detachably. The raised assembly structures 22, 24 may be constructed differently and adapted suitably, depending on the vehicle body to be conveyed, for which reason the raised assembly structures 22, 24 will not be discussed further here.

At one end of the skid 12 a coupling eye 26 is provided as part of a coupling device, which coupling eye 26 is carried in the present exemplary embodiment by the cross-member 18a, which is aligned flush with the corresponding ends of the support runners 16a, 16b. At the opposite end of the skid 12 a coupling hook 28 which fits the coupling eye 26 is provided as the other part of the coupling device. The coupling hook 28 is mounted on a bar 30 which runs perpendicularly between the support runners 16a, 16b and is mounted rotatably. Two skids 12 can thus be connected to one another, in that the coupling hook 28 of the first skid 12 engages in the coupling eye 26 of the second skid 12. This will be discussed further below.

Adjacent to the end of the coupling hook 28, each support runner 16a, 16b of the skid 12 has on the outside a respective swivellable running wheel 32a, 32b, which is rotatable on an axle 33a, 33b and represents a running means of the skid 12. Each running wheel 32a, 32b is mounted on an end of a respective pivoted member 34a, 34b, in such a way that the axle 33a, 33b of the running wheel 32a, 32b is rotatable about the longitudinal axis of the pivoted member 34a, 34b. This is indicated in the case of the running wheel 32a by a double arrow 36. The longitudinal axis of the pivoted member 34a, 34b is perpendicular to the axle 33a, 33b of the respective associated running wheel 32a, 32b. The running wheels 32a, 32b may be made of steel or plastics material. They have a diameter of, for example, 200 mm.

At their ends located opposite the respective running wheels 32a, 32b, the pivoted members 34a, 34b are connected rigidly to one another via a pivot bar 38. The pivot bar 38 is disposed between and through the support runners 16a, 16b of the skid 12, perpendicularly thereto, being mounted rotatably in the support runners 16a, 16b by means of a bearing not denoted by a separate reference sign. In this way the running wheels 32a, 32b can be swivelled between a rest position shown in FIG. 2 and an operating position which will be discussed later, as is indicated in FIG. 2 by a double arrow 40.

In order to lock the running wheel 32a, 32b in their rest position or their operating position, there is provided a latching device 42 which is explained below.

The running wheels 32a, 32b, the pivoted members 34a, 34b, the pivot bar 38 and the latching device 42 together form a running gear assembly 44a. A further running gear assembly 44b, corresponding structurally to the running gear assembly 44a, is provided at the opposite end of the skid 12, as shown in FIG. 2.

In FIG. 2 the skid 12 is shown on a section 46a of a roller conveyor 46. The latter comprises, in a manner known per se, two hollow-profile roller rails 48a, 48b disposed parallel to one another, which are connected to one another via hollow-profile cross-members. Non-driven transport rollers 52a, 52b and driven transport rollers 54a, 54b are mounted alternately in the longitudinal direction in the roller rails 48a, 48b respectively, which longitudinal direction corresponds in FIG. 2 to the longitudinal direction 14 of the skid 12. Non-driven transport rollers 52a, 52b are always arranged opposite driven transport rollers 54b, 54a.

Each of the driven transport rollers 54a, 54b has its own associated electric hub drive which forms a compact unit with the transport roller 54a, 54b. The hub drives are connected to one another via a common voltage supply, but are individually activatable via a control bus.

In the conveyor installation 10 shown in FIG. 1, two such sections 46a of a roller conveyor 46, one of which is shown in FIG. 2, are indicated merely by broken lines.

In addition to the roller conveyor 46, the conveyor installation 10 shown in FIG. 1 includes a buffer area 56. In such a buffer area loaded or unloaded skids 12 park in a waiting loop before they are supplied to a further treatment station. In this way a uniform throughput rate can be maintained with a plurality of treatment stations served by the conveyor installation 10.

The buffer area 56 shown in the present exemplary embodiment comprises two straight buffer sections 58a, 58b, the paths of which are predefined by respective floor rails 60a, 60b. The floor rails 60a, 60b in turn each comprise two parallel rail sections 62. The rail sections 62 may be made of steel, in particular an L-section steel, or plastics material, such as polyvinyl chloride.

Figure 3:
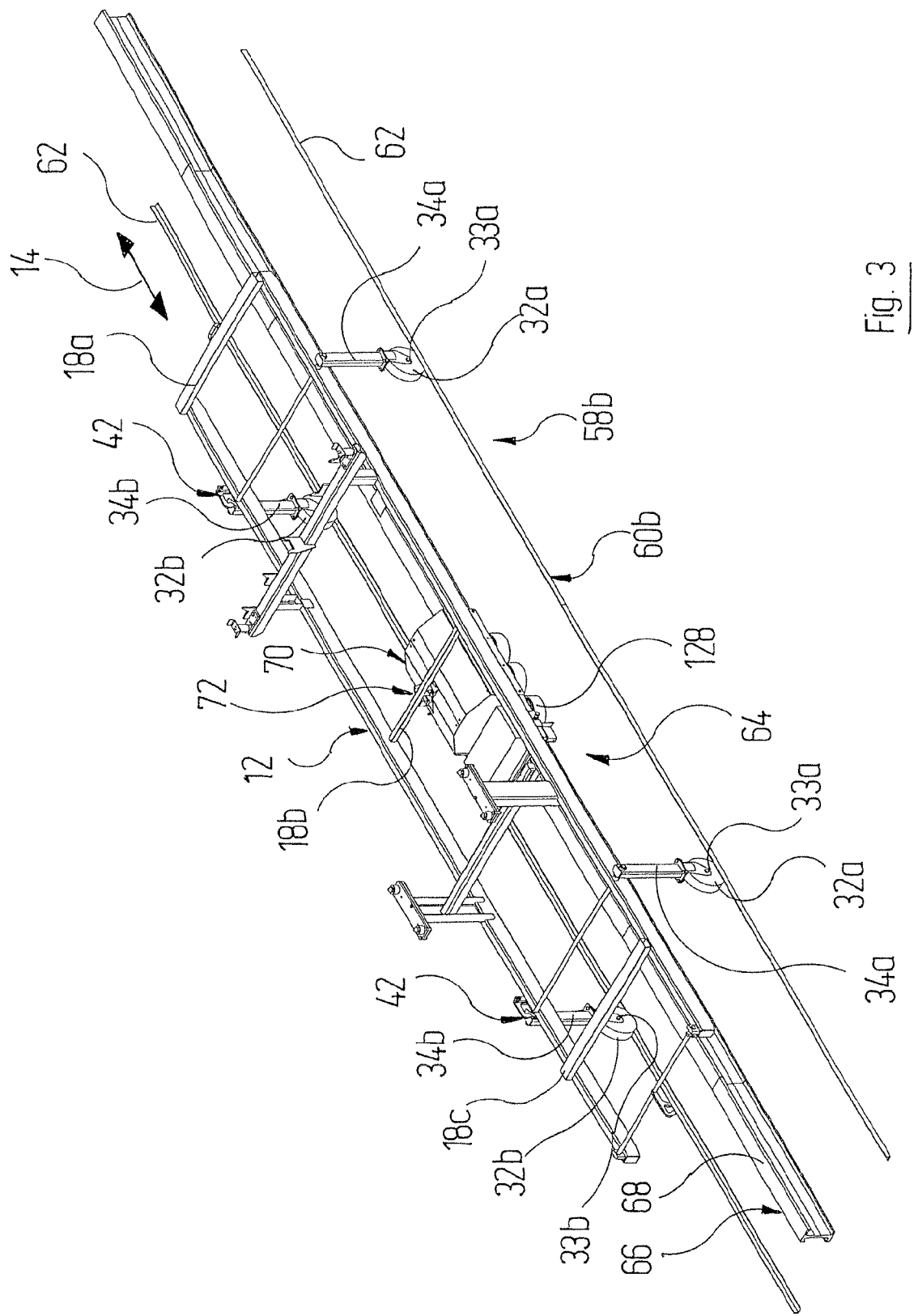
FIG. 3 is a perspective representation of the skid according to FIG. 2 inside a buffer area of the conveyor installation according to FIG. 1, which skid is coupled to a separate drive unit.

FIG. 3 shows a portion of the buffer section 58b with a skid 12 arranged therein, on an enlarged scale. As can be seen in this Figure, the skid 12 in the buffer area 56 is running on its running wheels 32a, 32b which are swivelled out to their operating position. In the operating position of each running wheel 32a, 32b, the respective associated pivoted member 34a, 34b is locked by means of the latching device 42 in a position in which it is disposed substantially perpendicularly downwards with respect to the above-mentioned support plane of the skid 12. The axle 33a, 33b of each running wheel 32a, 32b is therefore rotatable in its operating position about an axis which is perpendicular to the support plane.

The distance between the rail sections 62 of the floor rail 60b is so selected that they flank the running wheels 32a, 32b (cf. FIG. 3), which are rotatable about the longitudinal axis of the respective pivoted member 34a, 34b, on the outside, so that rotation of the running wheels 32a, 32b in the region of the floor rail 60b is prevented and the skid is guided by the floor rail 60b when moving in its longitudinal direction 14.

Inside the buffer area 56 the skid 12 is driven by means of a drive system 64 which deviates from the principle of the driven transport rollers 54a, 54b of the roller conveyor 46 shown in FIG. 2, and an overview of which can be seen in FIG. 1. To achieve this, a single-track guide rail 66 in the form of a double T-profile is disposed centrally between and parallel to the rail sections 62 and the floor rail 60b. The guide rail 66 may be made, for example of an aluminium alloy, such as AlMgSi 05 F 25, or a plastics material.

The guide rail 66 of the drive system 64 may be composed from individual rail segments 68, as is shown, inter alia, in FIGS. 1 and 3.

A plurality of drive units 70 which can be driven individually in both directions along the guide rail 66 are arranged on the guide rail 66. Each drive unit 70 includes a coupling device 72 which cooperates with the middle cross-member 18b of the skid 12 and can be coupled thereto (cf. FIG. 3). When the drive unit 70 is coupled to the cross-member 18b of the skid 12, the skid 12 follows the movement of the drive unit 70 along the guide rail 66 in a conveying direction which corresponds to a direction of the double arrow 14. The drive unit 70 and its coupling device 72 are discussed again in more detail below.

It can also be seen in FIG. 1 that in the conveyor installation 10 a transfer station 74a, 74b is provided between each buffer section 58a, 58b of the buffer area 56 and a respective section 46a of the roller conveyor 46. These transfer stations 74a, 74b serve, in the case of a skid 12 which is moving on its running wheels 32a, 32b inside the buffer area 56, to swivel the running gear assemblies 44a, 44b from their operating position to their rest position, so that the skid 12 can be conveyed on its support runners 16a, 16b on the roller conveyor 46. If a skid 12 is to be transferred from the roller conveyor 46 to a buffer area 56, the transfer station 74 serves to swivel the running gear assemblies 44a, 44b from their rest position to their operating position.

Figure 4:
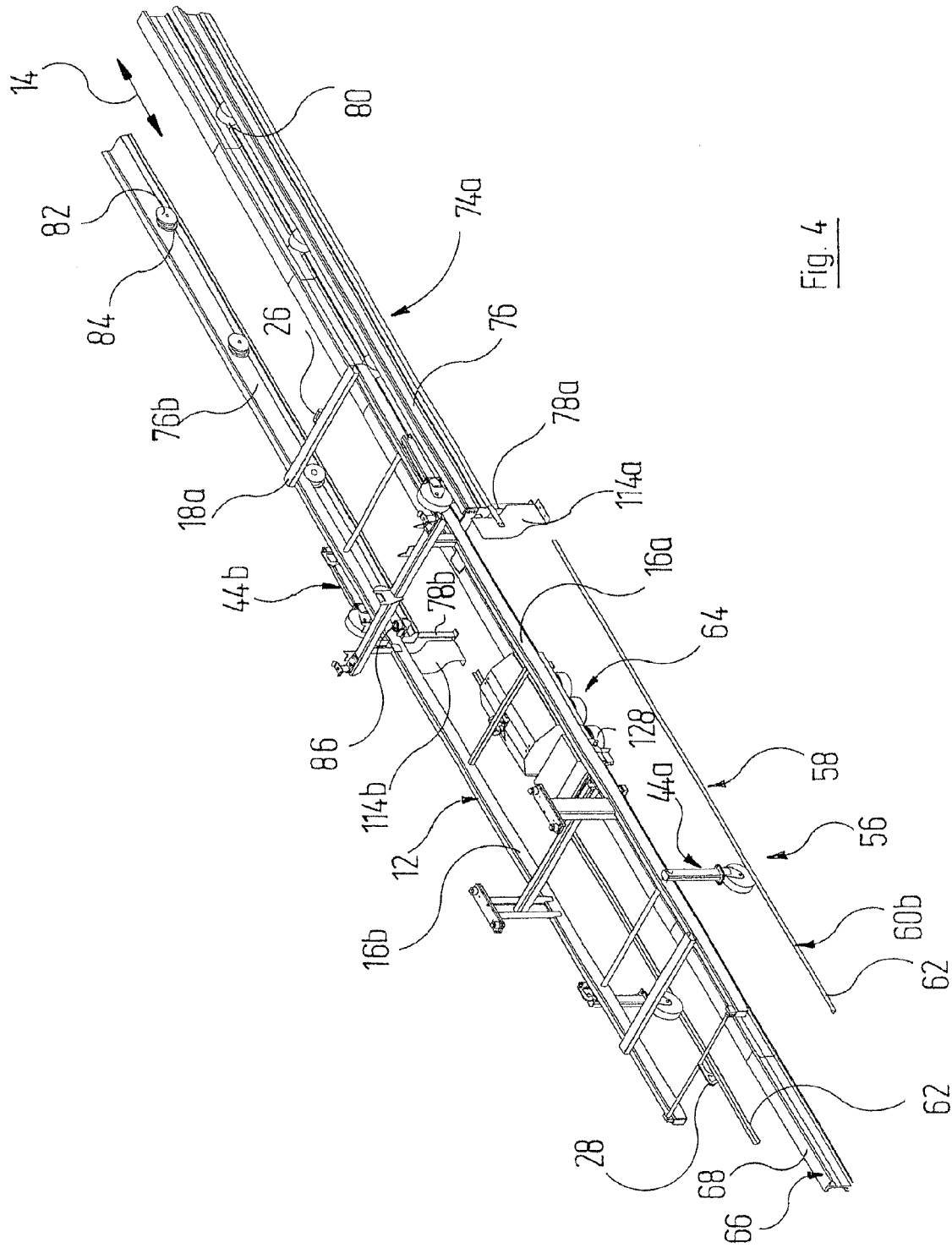
FIG. 4 is a perspective representation of the skid according to FIG. 3 at the transition between the buffer area and a transfer station.

An end region of the transfer station 74a oriented towards the buffer section 58a of the buffer area 56 can be seen in FIG. 4. FIG. 4 also shows a skid 12, the end portion of which carrying the running gear assembly 44b in its rest position, is located in the transfer station 74a, and the remaining portion of which, carrying the running gear assembly 44a in its operating position, is located in the buffer area 56 or on the buffer section 58a thereof.

As can be seen in FIG. 4, the transfer station 74a includes two roller members 76a, 76b disposed parallel to one another in the conveying direction 14 (again indicated by a double arrow). At their opposite ends, the roller members 76a, 76b each have respective feet 78a, 78b which are anchored to the floor.

The roller member 76a has on its inner side oriented towards the opposite roller member 76b a plurality of uniformly spaced rollers 80 disposed in the longitudinal direction 14, on which the skid 12 can run with its support runner 16a. The roller member 76b in turn has on it inner side oriented towards the roller member 76a a plurality of guide rollers 82 which are arranged opposite the rollers 80 of the roller member 76a and which have a groove 84, the width of which is so dimensioned that the support runner 16b of the skid 12 can run therein. In this way the skid 12 is guided laterally when it rests on the rollers 80, 82 of the transfer station 74a with its support runners 16a, 16b.

Every second roller 80 along the roller member 76a, and every second roller 82 along the roller member 76b, is driven, a driven roller 80 always being positioned opposite a non-driven roller 82, and a non-driven roller 80 opposite a driven roller 82.

Associated with each of the driven rollers 80, 82 is an electric hub drive which forms a compact assembly with the respective roller 80, 82. As in the case of the roller conveyor 46, the hub drives are connected via a common voltage supply but are activatable individually via a control bus.

The transfer station 74a explained up to now, and the transfer station 74b, correspond largely to a roller conveyor known per se, below which, however, a drive unit can be driven.

The height of the transfer station 74a is such that the support surfaces of the rollers 80 and 82 lie in a common transport plane with the support surfaces of the transport rollers 52a, 52b and 54a, 54b of the roller conveyor 46. This height may be, for example, 500 mm above a floor (or false floor) of a building.

The dimensions of the pivoted members 34a, 34b of each running gear assembly 44a, 44b of the skid 12, and of the associated running wheels 32a, 32b, are so coordinated with one another that the undersides of the support runners 16a, 16b of the skid 12 lie approximately at the height of this transport plane, when the running wheels 32a, 32b occupy their operating position and rest on the floor (or false floor) of the building. At the ends of each support runner 16a, 16b, the underside thereof is inclined upwardly towards the end. This inclined portion of the support runners 16a, 16b ensures that, as the skid enters the transfer station 74a or the roller conveyor 46, blocking of the skid 12 against the associated rollers 80, 82 or 52, 54 cannot occur.

So that the support runner 16a of the skid 12 passes reliably into the grooves 84 of the guide rollers 82 as the skid 12 enters the transfer station 74a, a positioning aid, in the form of a roller 86 arranged parallel to the transport plane and rotatable about an axis perpendicular to the transport plane, is provided at both ends of the roller member 76b. As can be seen in FIG. 4, the roller 86 is so arranged that it runs along the inner face of the support runner 16b of the skid 12 when the latter enters the transfer station 74a. A further roller may be provided which runs along the outer face of the support runner 16b of the skid 12, whereby the support runner 16b is retained in its track between two rollers 86.

As can also be seen with reference to FIG. 4, the running gear assemblies 44a, 44b of the skid 12 must be swivelled from their operating position to their rest position when the skid 12 coming from the buffer area 56 enters the transfer station 74a. This is explained below with reference to FIGS. 5 to 8.

Figure 5:
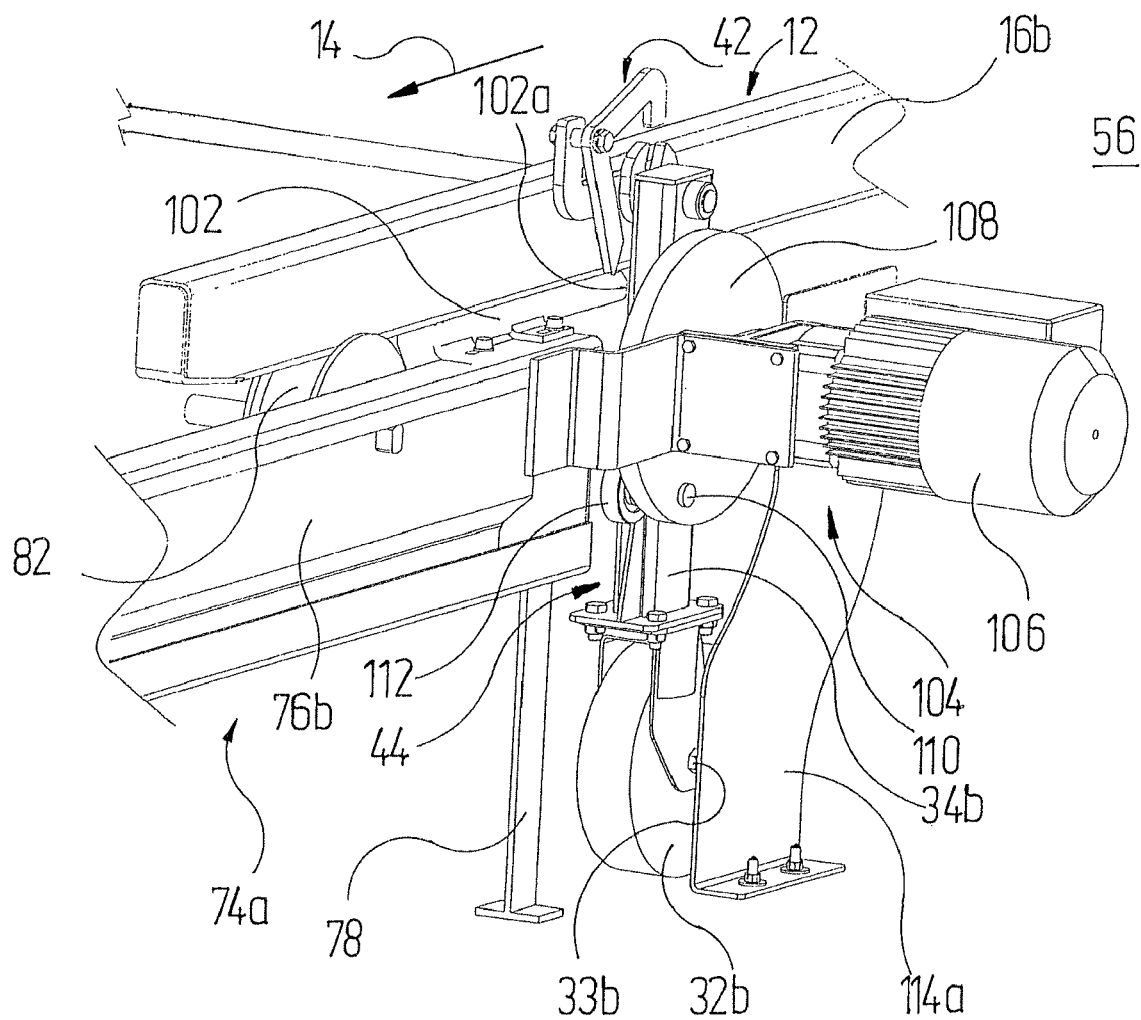
FIG. 5 is a partial perspective view of the skid and the transfer station, the skid being shown in a first position when entering the transfer station and a swivellable running wheel being seen in an operating position.

As can be seen in FIG. 5, the skid 12 first moves into the transfer station 74a until the pivoted members 34a, 34b of the corresponding running gear assembly 44 are located shortly before the roller members 76 of the transfer station 74a. In this position the skid 12 already rests with the corresponding end portions of its support runners 16a, 16b (only the support runner 16b being visible in FIG. 5) on a respective roller 80 or guide roller 82 of the transfer station 74a.

As discussed above, the running gear assembly 44 is locked in its operating position by means of the latching device 42. As can be seen clearly in FIGS. 6A and 6B, in the present exemplary embodiment the latching device 42 comprises an L-shaped latching hook 88, one end of which is chamfered towards the inside and on the other end of which is provided a short retaining arm 90 curved towards the other L-shaped arm and including an angle of approximately 70° with the L-shaped arm carrying it. The latching hook 88 has at the apex of the L-shape a through-bore 92 via which it is fitted swivellably on to a spindle 94. The spindle 94 is disposed perpendicularly to the longitudinal direction 14 of the skid 12 and parallel to the support plane of the skid 12, and is retained in its turn by a support strut 96 which is mounted to the outside of the support runner 16b of the skid 12.

Figure 6A:
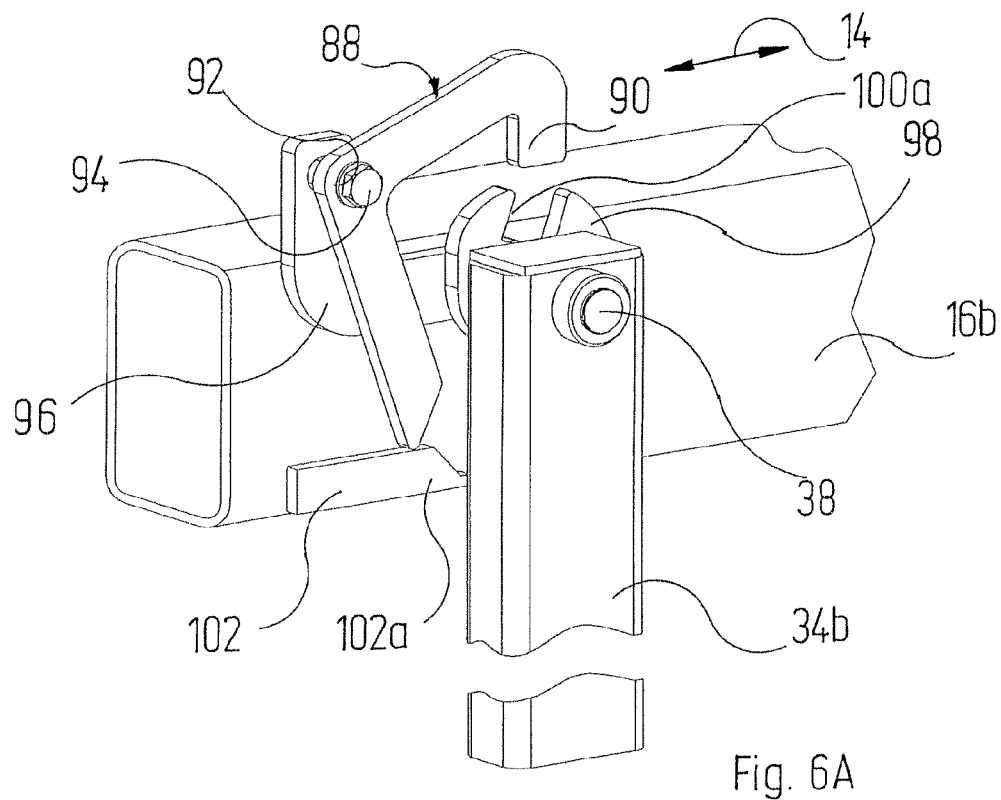
FIGS. 6A and 6B are enlarged side views of a locking mechanism for locking the swivellable running wheel of the skid in its operating position or in a rest position.
Figure 6B:
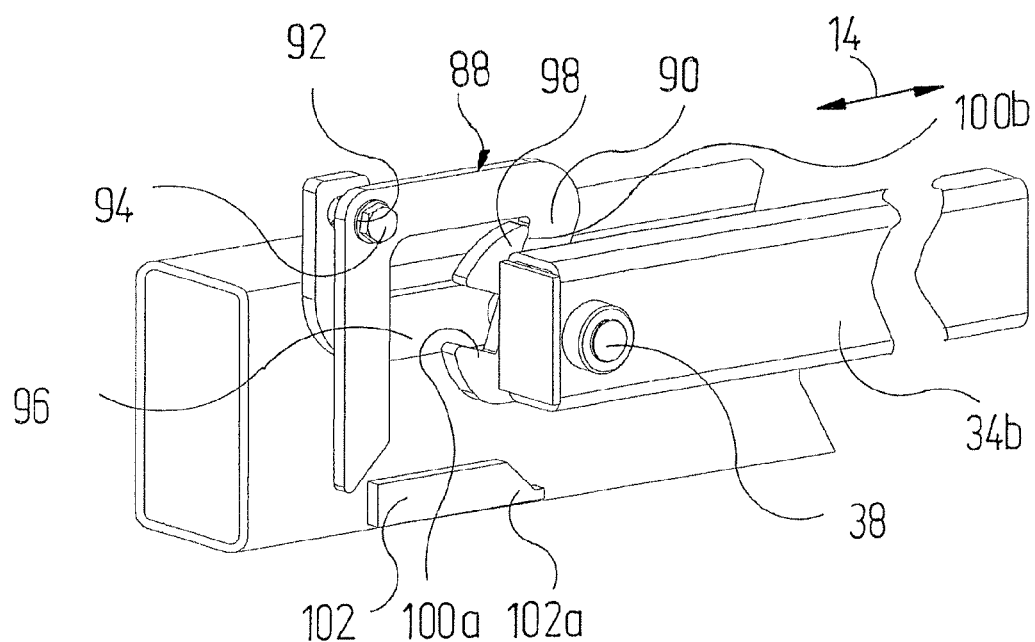

A latching disc 98 is connected rigidly to the pivoted member 34b of the running gear assembly 44 as the mating piece of the latching hook 88. The latching disc 98 is arranged perpendicularly to the support plane of the skid 12 and parallel to its longitudinal direction 14. The latching disc 98 has on its periphery two recesses 100a, 100b offset by 90° to one another and is so arranged that the retaining arm 90 of the latching hook 88 can engage in the recess 100a of the latching disc 98 when the running gear assembly 44 occupies its operating position, as can be seen in FIG. 6A. When the running gear assembly 44 adopts its rest position, the retaining arm 90 of the latching hook 88 can engage in the recess 100b of the latching disc 98; this is shown in FIG. 6B.

When the latching hook 88 is latched in the latching disc 98 in the operating position of the running gear assembly 44, it occupies the same position as when it is latched in the recess 100b of the latching disc 98 in the rest position of the running gear assembly 44.

In order to release the latching hook 88 from the recess 100a of the latching disc 98 and thereby to make possible swivelling of the running gear assembly 44 when the skid enters the transfer station 74a from the buffer area 56, an abutment rail 102 is provided at the end of the roller member 76b of the transfer station 74a, and projects in the longitudinal direction 14 with respect to said roller member 76b. Said abutment rail 102 is arranged at the height at which its free end 102a pushes against the chamfered end of the latching hook 88 when the skid 12 is moved in the direction towards the transfer station 74a.

The end 102a of the abutment rail 102 is chamfered upwardly in the direction towards the transfer station 74a (cf. FIG. 6A). As the skid 12 enters the transfer station 74a, the end 102a of the abutment rail 102 first pushes against the corresponding end of the latching hook 88 and rotates the latter, as the skid moves further in the direction of the arrow 14 (cf. FIG. 5), about its swivel axis 94. As this happens the retaining arm 90 is moved out of the recess 100a of the latching disc 98, whereby the running gear assembly 44 is no longer locked.

In order now to transfer the no longer locked running gear assembly 44 from its operating position shown in FIG. 5 to its rest position, a swivelling device 104 is provided ahead of the transfer station 74a in the direction towards said transfer station 74a. This swivelling device 104 comprises a controllable electric motor 106 which drives a rotary disc 108, the axis of rotation of which is disposed perpendicularly to the direction of travel 14 of the skid 12 and parallel to its support plane. When entering the transfer station 74a, the skid 12 can bypass the rotary disc 108 on the inside. The latter carries eccentrically, via a connecting spindle 110, an abutment roller 112, the connecting spindle 110 being disposed parallel to the axis of rotation of the rotary disc 108. The abutment roller 112 is arranged offset so far inwardly in relation to the transfer station 74 that the pivoted member 34b of the corresponding running gear assembly 44 pushes against it when the skid 12 has moved far enough into the transfer station 74a.

As the skid 12 enters the transfer station 74a, as illustrated in FIG. 5, the rotary disc 108 of the swivelling device 104 is initially set in such a position that the abutment roller 112 adopts a starting position in which it is arranged below the end 102a of the abutment rail 102 of the transfer station 74a, and below a plane parallel to the transport plane which passes through the centre of the rotary disc 108.

It is thereby ensured that, as the skid 12 enters the transfer station 74a, the latching device 42 is first unlocked, as described above, before the pivoted member 34b pushes against the abutment roller 112, since the latching hook 88 has already been swivelled away by the abutment rail 102.

Figure 7:
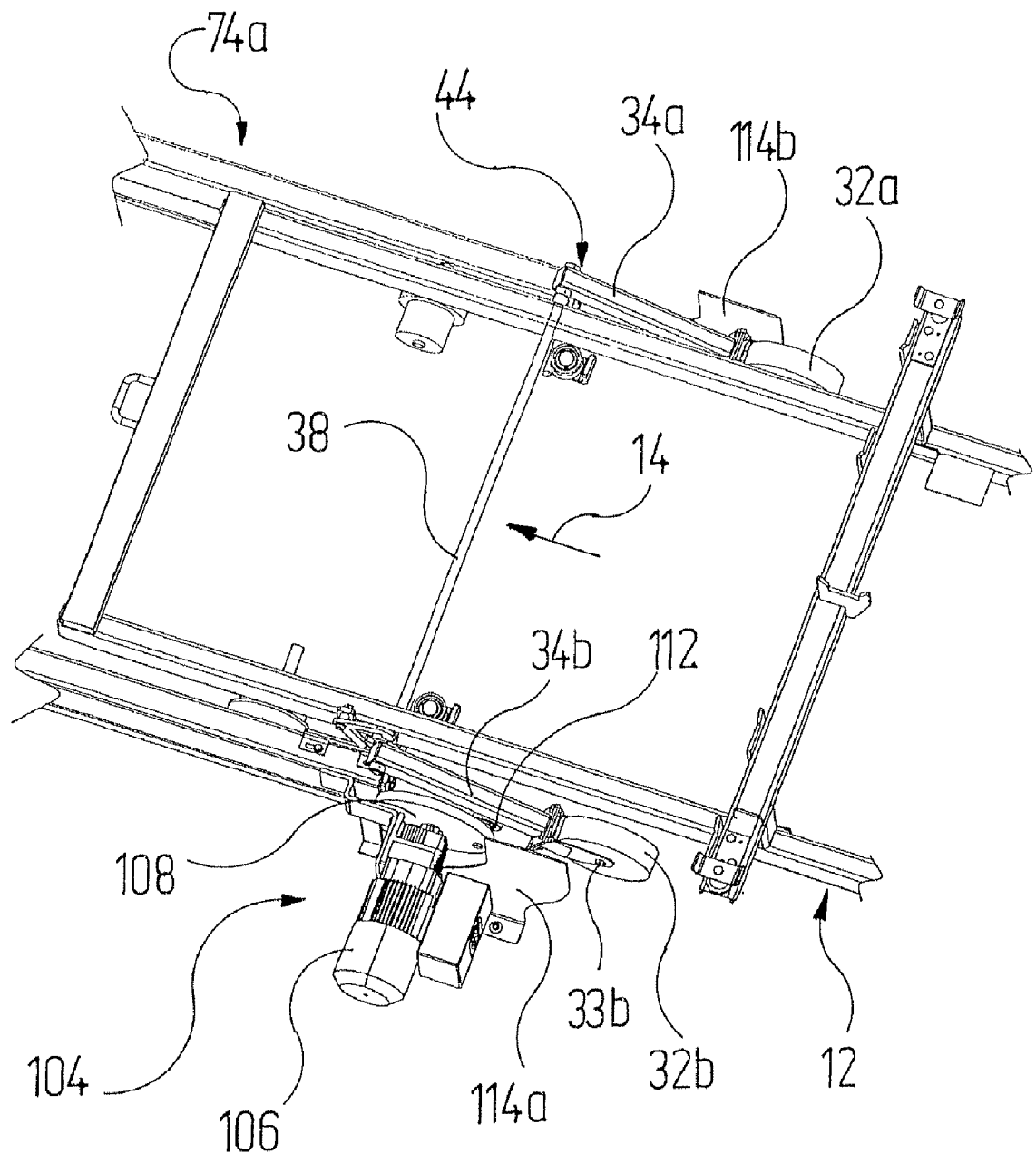
FIG. 7 is a partial perspective view of the skid shown in FIG. 5 from a different viewing direction, in a second position when entering the transfer station, the swivellable running wheel occupying an intermediate position.

As the skid 12 moves further in the direction of the arrow 14, the pivoted member 34b of the running gear assembly 44 is swivelled about the pivot bar 38, being guided in its swivelling movement by the abutment roller 112 of the swivelling device 104. During the further movement of the skid 12 in the direction of the arrow 14, the rotary disc 108, in coordination therewith, is rotated anticlockwise, viewed from the outside, whereby the pivoted member 34b is guided upwardly until the wheel arrangement 44 reaches its rest position. Because the two pivoted members 34a and 34b of the running gear assembly 44 are connected rigidly to one another via the pivot bar 38, the opposite pivoted member 34a with the running wheel 32a follows the swivelling movement of the pivoted member 34b. This is shown in FIG. 7 with reference to an intermediate position.

The movement of the skid 12 in the direction of the arrow 14, the rotation of the rotary disc 108 of the swivelling device 104 and the length of the abutment rail 102 of the transfer station 74 are so coordinated with one another that the chamfered end of the latching hook 88 leaves the region of the abutment rail 102 after the running gear assembly 44 has adopted its rest position. As a result, the latching hook 88 falls into its rest position shown in FIG. 6B, in which its retaining arm 90 engages in the recess 100b of the latching disc 98, whereby the running gear assembly 44 is locked in its rest position.

The same process takes place when the second of the two running gear assemblies 44a, 44b reaches the transfer station 74a. For this purpose, however, the rotary disc 108 must again be so rotated that the abutment roller 112 adopts its starting position described above.

As the skid 12 enters the transfer station 74, the latter's driven rollers 80, 82 are so activated that they convey the skid 12 at the same speed as the drive unit 70.

Figure 8:
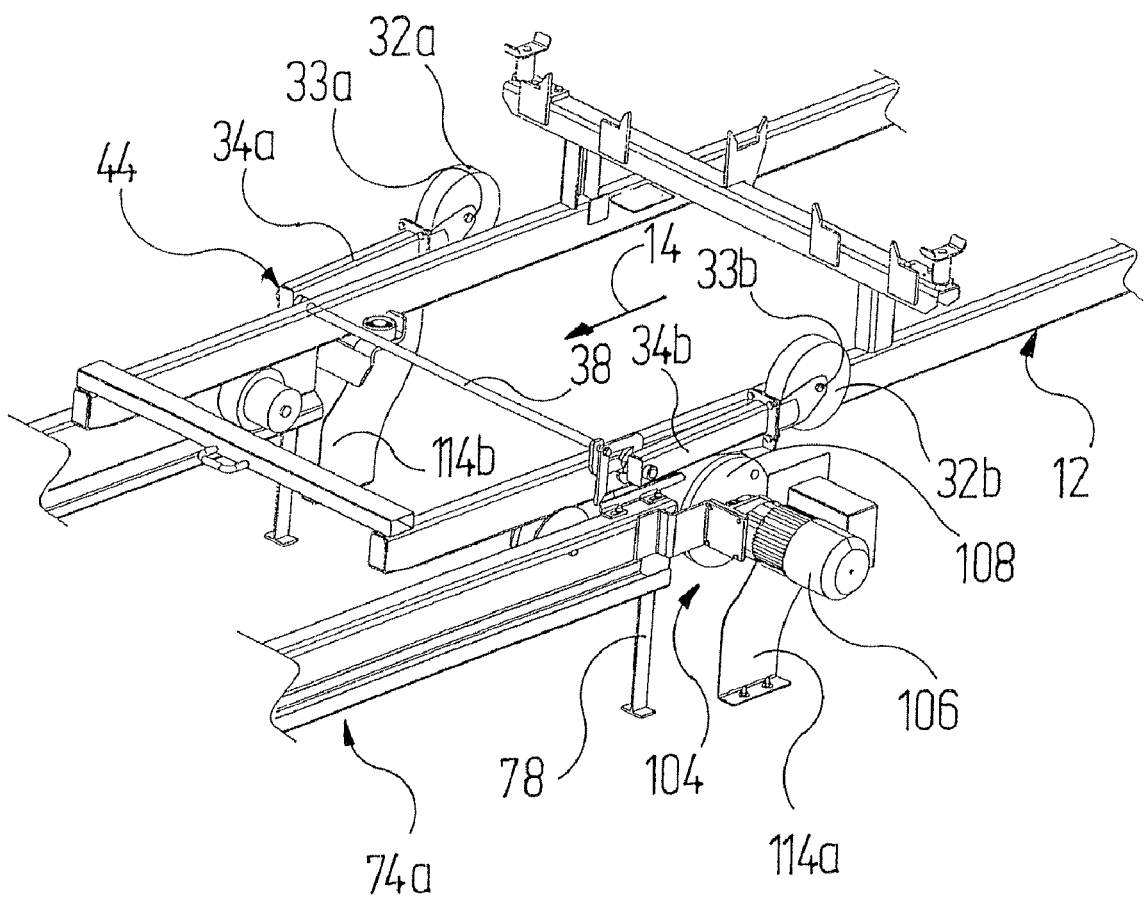
FIG. 8 is a partial perspective view of the skid shown in FIGS. 5 and 7 from a different viewing direction, in a third position when entering the transfer station, the swivellable running wheel occupying its rest position.
Figure 9:
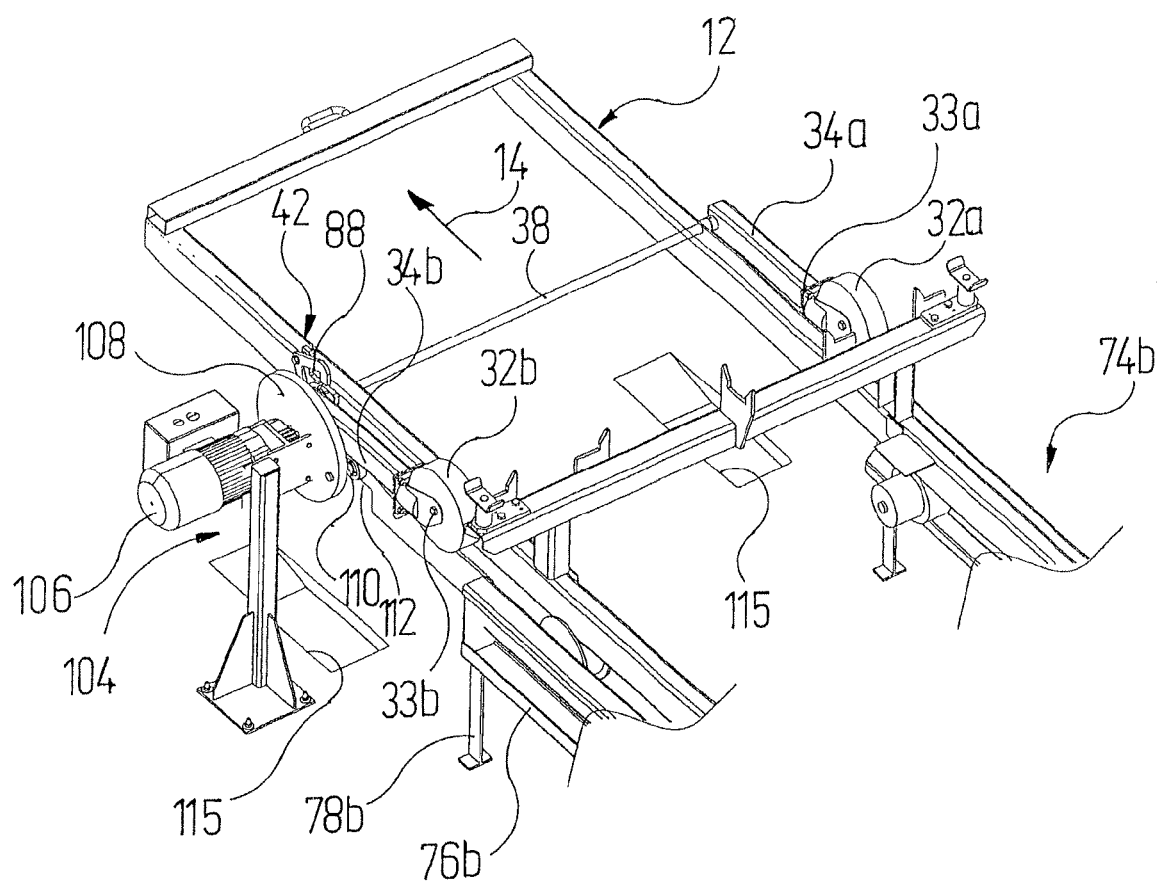
FIG. 9 is a partial perspective view of the skid in a first position when exiting the transfer station, the swivellable running wheel still occupying its rest position.
Figure 10:
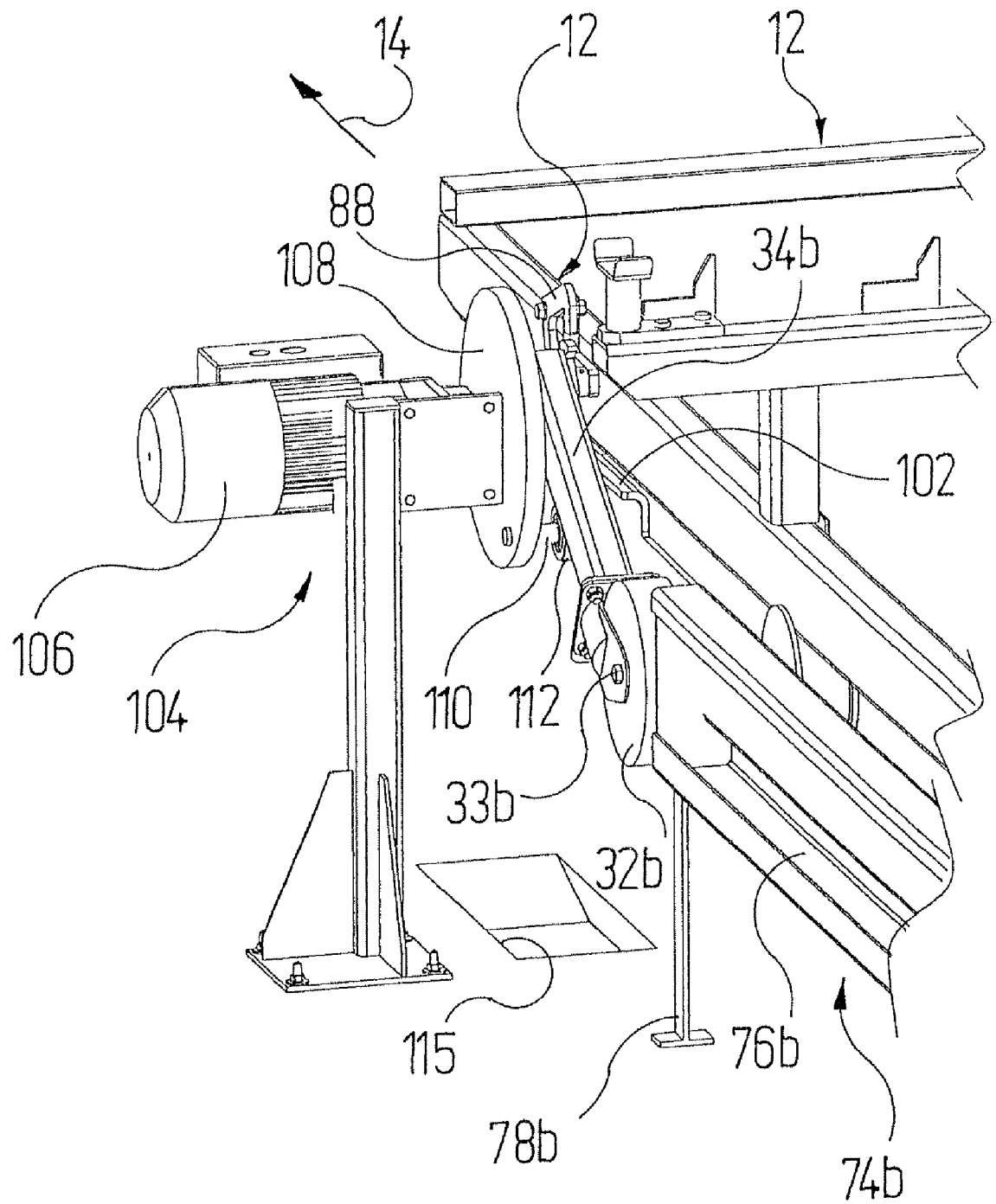
FIG. 10 is a partial perspective view of the skid shown in FIG. 9 from a different viewing direction, in a second position when exiting the transfer station, the swivellable running wheel occupying an intermediate position.

As can be seen in FIG. 8, the axles 33a, 33b of the respective running wheels 32a, 32b are arranged above the support runners 16a, 16b of the skid 12 in the rest position of the running gear assembly 44. So that the running rollers 32a, 32b, which are rotatable about the longitudinal axis of the associated pivoted member 34a, 34b, do not twist when swivelling from the operating position to the rest position, for example as a result of gravity, and cannot therefore strike against the support runners 16a, 16b of the skid 12 while swivelling, a sheet metal guide 114a, 114b is provided along the movement path of the respective running wheel 32a, 32b, which sheet metal 114a, 114b guides receive the corresponding running gear assembly 44 between them and hold the axles 33a, 33b of the respective running wheels 32a, 32b substantially perpendicular to the conveying direction 14, and in a plane parallel to the support plane of the skid 12, during the swivelling.

FIGS. 5, 7 and 8 show the entry end of the transfer station 74a to which the skid 12 coming from the buffer area 56 is to be supplied. An exit end of the transfer station 74b, to which the skid 12 coming from the roller conveyor 46 is to be supplied, is shown in different views in FIGS. 9 to 12. In these Figures the arrangement of the individual components for swivelling the running gear assembly 44 deviates somewhat from that at the entry end of the transfer station 74a.

Figure 11:
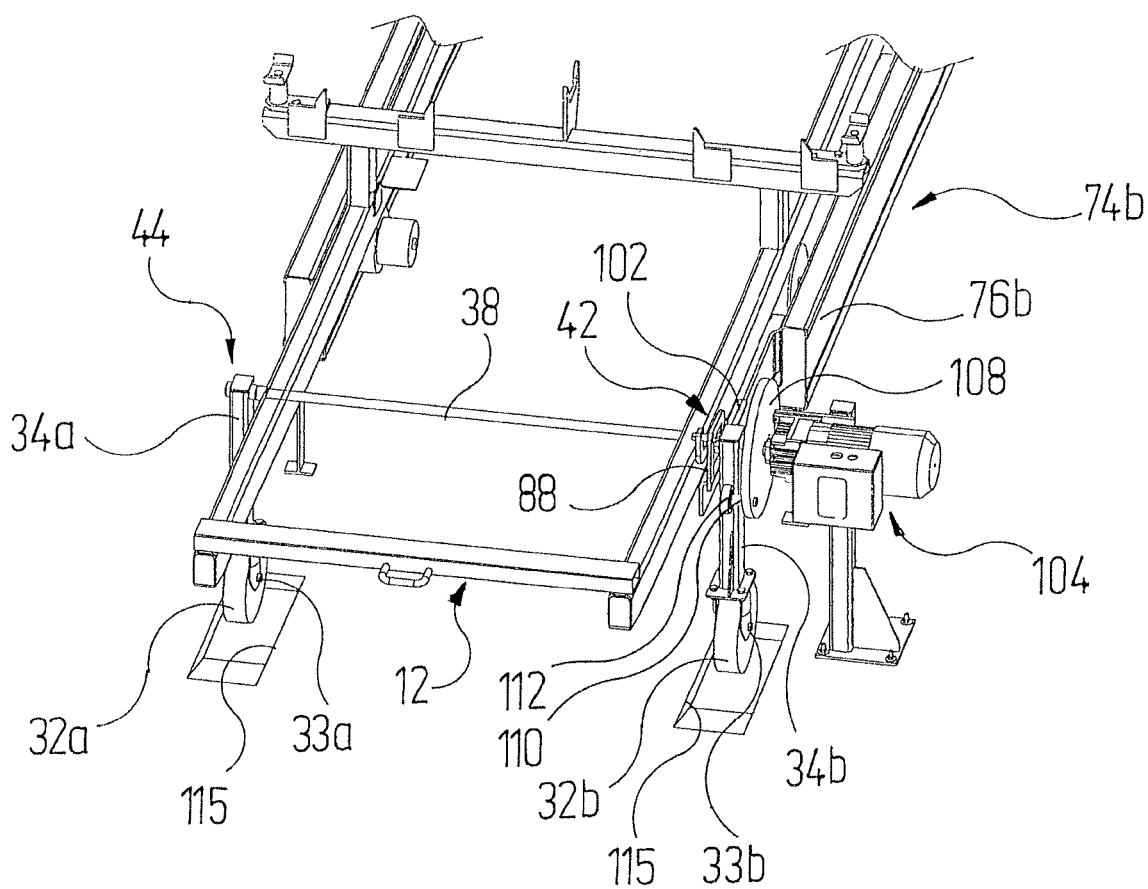
FIG. 11 is a partial perspective view of the skid shown in FIGS. 9 and 10 from a different viewing direction, in a third position when exiting the transfer station, the swivellable running wheel occupying its operating position.
Figure 12:
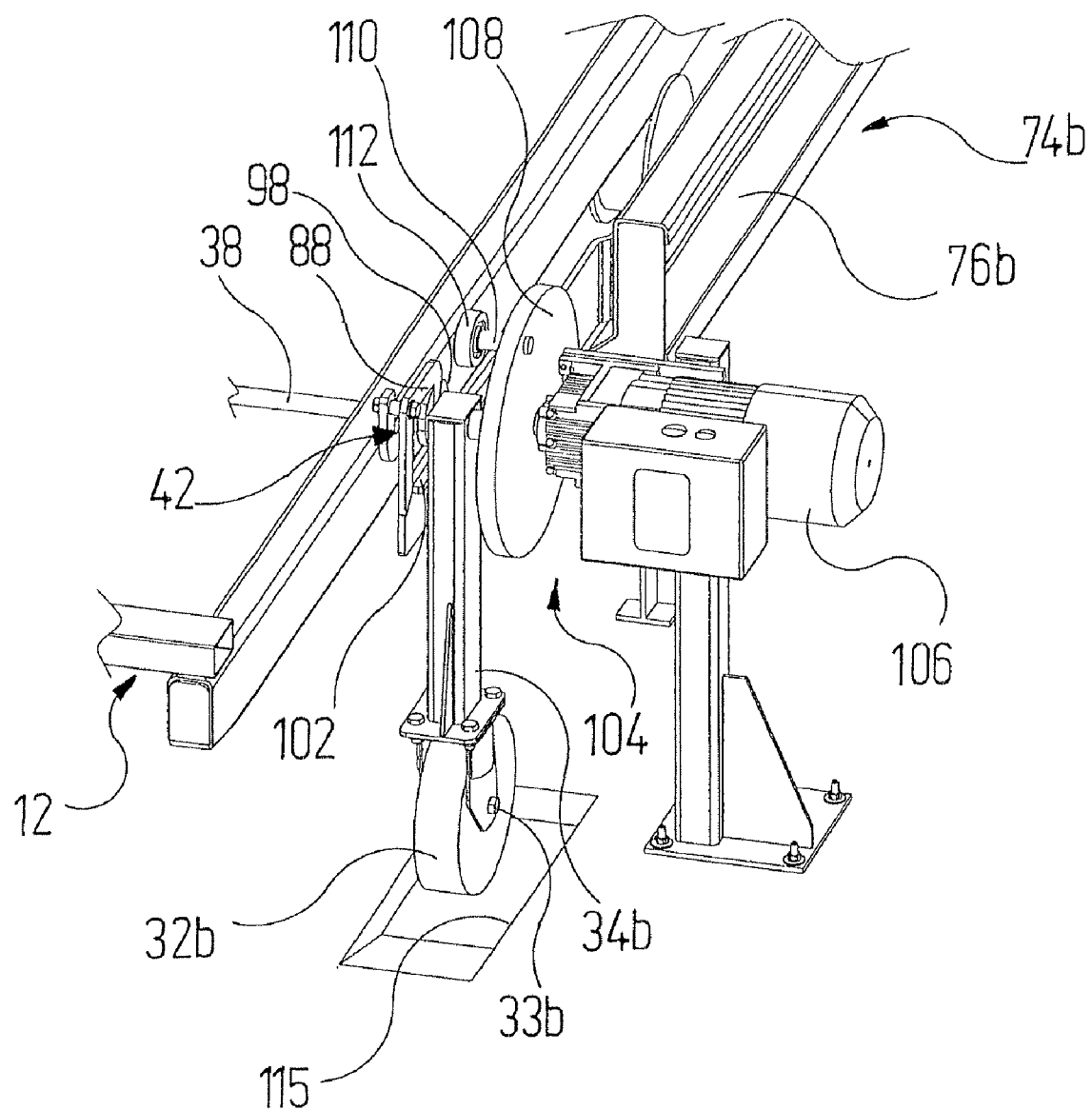
FIG. 12 is a partial view in an enlarged perspective representation of the skid shown in FIGS. 9 to 11 after completion of the swivelling operation.

For example, the abutment rail 102 is arranged at a distance from the roller member 76b of the transfer station 74b, as can be seen in particular in FIG. 11. The swivelling device 104 is also arranged at a greater distance from the roller member 76b of the transfer station 74b than at the entry end of the transfer station 74a. This measure results from the fact that there must be sufficient space between the abutment rail 102 and the swivelling device 104 at the exit end of the transfer station 74b for the running gear assemblies 44, or their pivoted members 34a, 34b, to be able to swivel downwardly with their running wheels 32a, 32b from the rest position to the operating position.

The sequence of the swivelling of the running gear assemblies 44 corresponds substantially in this case to a reverse of the process which takes place as the skid enters the transfer station 74a.

The speed of the driven rollers 80, 82 of the transfer station 74b and the speed of the drive unit 70 conveying the skid 12 onwards after the transfer station 74b are so coordinated with one another that a substantially uniform transition of the skid 12 from the transfer station 74b to the buffer area 56 takes place, in relation to the conveying velocity of the skid 12.

The rotary disc 108 of the swivelling device 104 is first moved to a position in which the abutment roller 112 is arranged approximately beside the centre of the rotary disc 108 in the direction towards the transfer station 74b, so that the pivoted member 34b rests on the abutment roller 112 when it comes into the region of the swivelling device 104. Through abutment with the abutment rail 102, the latching hook 88 is guided out of the recess 100b of the latching disc 98, whereby the corresponding running gear assembly 44 is no longer locked in its rest position.

As the skid 12 moves further in the direction of the arrow 14, the rotary disc 108 is rotated clockwise by means of the electric motor 106, viewed from the outside, so that the pivoted member 34b of the running gear assembly 44 is swivelled downwardly (cf. FIG. 10) by gravity, while being guided by the abutment roller 102 of the swivelling device 104, until the running gear assembly 44 adopts its operating position (cf. FIG. 11). The floor has recesses 115 so that the running gear assembly 44 can swivel to its operating position without obstruction.

The length of the abutment rail 102 in the direction of the arrow 14 is such that when the running gear assembly 44 occupies its operating position the latching hook 88 is released and engages with its retaining arm 90 in the recess 100a of the latching disc 98. The running gear assembly 44 is thereby locked in its operating position.

It is apparent from the above exposition that the transfer stations 74a and 74b, which have an entry end and an exit end of different configuration, are designed, according to the exemplary embodiment described, for only one transit direction of the skid 12.

In a modification (not shown here) it is possible to enter and exit the transfer station 74 at both ends. For this purpose the skid 12 may, for example, be so configured that its running gear assembly 44a, 44b cannot swivel in the same direction but in opposite directions. For example, the running wheels 32a, 32b of each running gear assembly 44a, 44b could be oriented in their rest position towards the respective associated end of the skid 12. In this way, the two running gear assemblies 44a, 44b would be arranged mirror-symmetrically in a mirror plane which is disposed perpendicularly to the conveying direction 14 and perpendicularly to the support plane of the skid 12. The components of the swivelling device 104 of the transfer station 74 could then be arranged at both ends in the manner described in connection with FIGS. 5, 7 and 8.

If a skid 12 is used in which the running gear assemblies 44a, 44b swivel in the same direction, as shown in the Figures, a further modification (not shown here) of a transfer station 74 may be used. In this modification no swivelling device 104 is provided at the opposite ends of the transfer station 74, but there are arranged sheet-metal running plates inclined downwardly from the transport plane of the transfer station and running parallel away from the corresponding end, the respective running surfaces of which lie in a common plane.

The running wheels 32a, 32b run on these sheet-metal running plates as the skid 12 enters or exits the transfer station 74, the latching device 42 having been unlocked at this time by means of the abutment rail 102, as described above. On entering a transfer station, the running wheels 32a, 32b therefore run on sheet-metal running plates inclined upwardly in the direction of travel, whereby the associated running gear assembly 44a, 44b, guided by the sheet-metal running plates, is forced from its operating position to its rest position. Upon exiting a correspondingly configured transfer station 74, the running wheels 32a, 32b run on the sheet-metal running plates, which in this case are downwardly inclined in the direction of travel, swivelling of the corresponding running gear assembly 44a, 44b from the rest position to the operating position being effected by gravity. In this case the orientation of the skid 12 is such that the running gear assemblies 44a, 44b swivel in the direction opposite to the transit direction as the skid 12 passes through the transfer station 74.

Figure 13:
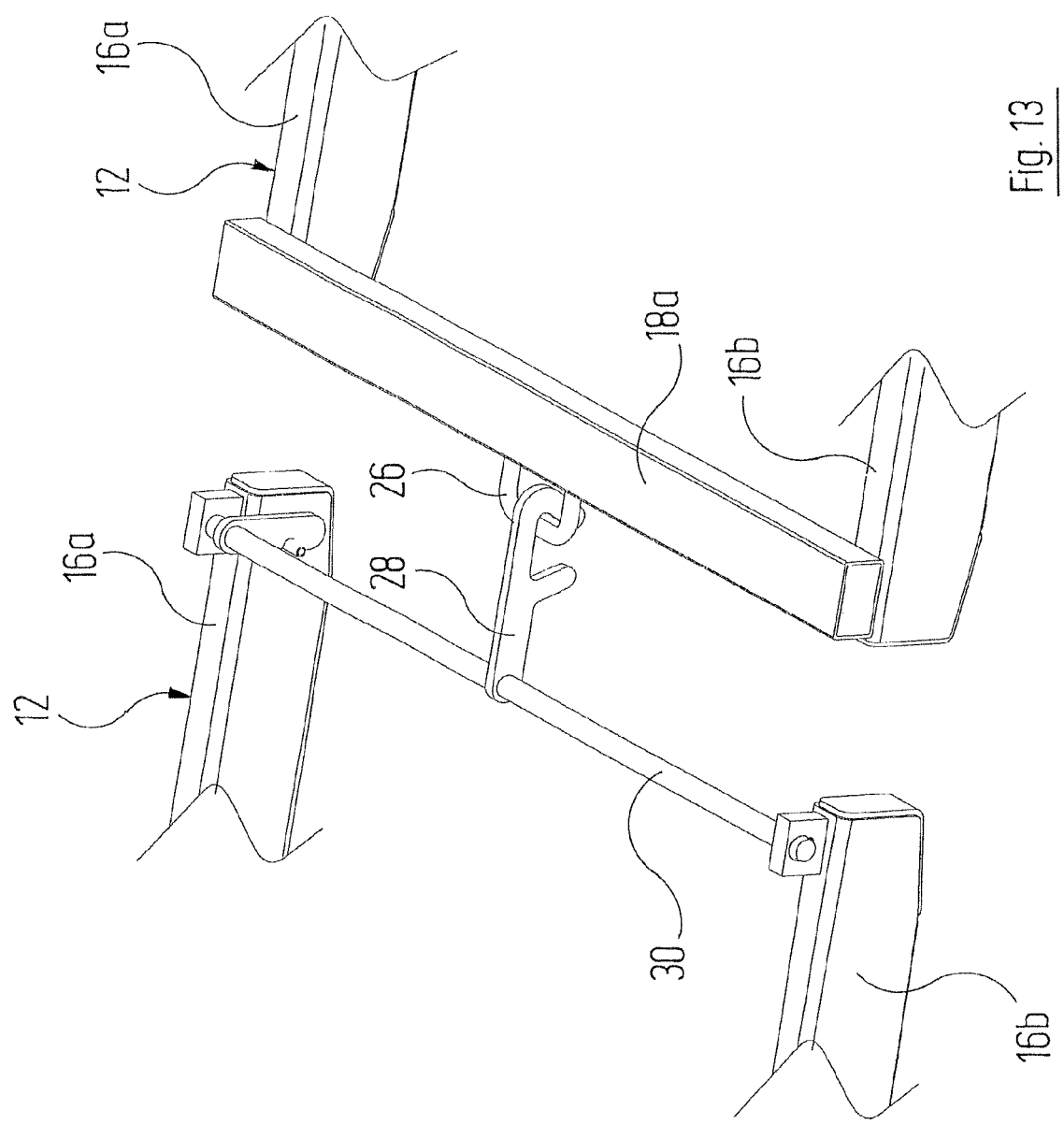
FIG. 13 is a perspective representation of a coupling which connects two skids detachably to one another.

FIG. 13 shows the ends of two skids 12 connected to one another, in an enlarged perspective view. In this case the coupling hook 28 of the one skid 12 engages in the coupling eye 26 of the other skid 12. In this way, two or more skids 12 can be connected to one another and conveyed in combination, in particular by a single drive unit 70.

Figure 14:
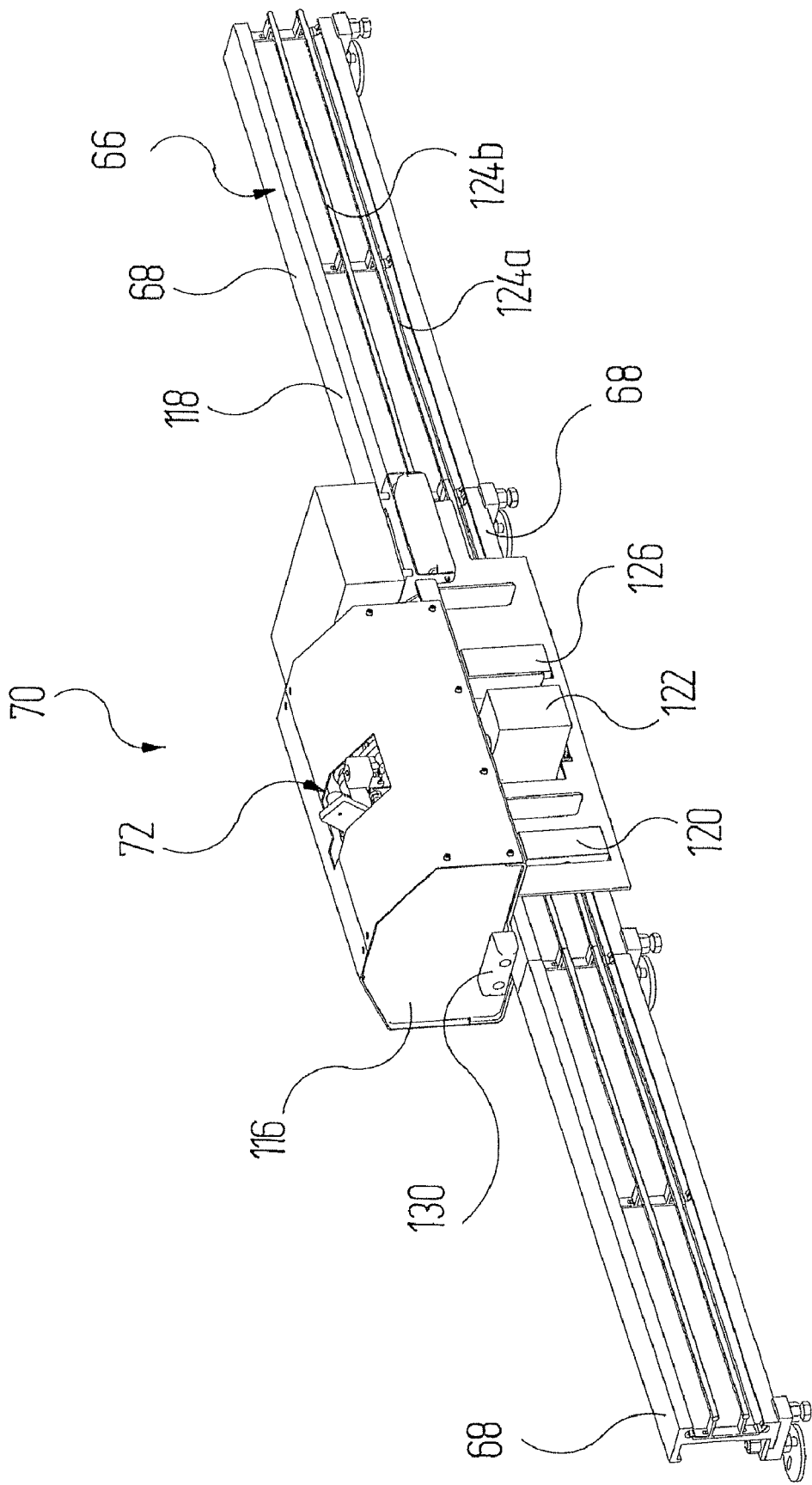
FIG. 14 is a perspective representation of a rail-guided separate drive unit for moving the skid.

The exemplary embodiment of the drive unit 70 shown in FIGS. 1, 3 and 4 is again represented in FIG. 14, together with three rail segments 68 of the guide rail 66, on an enlarged scale.

The drive unit 70 runs on the top 118 of the guide rail 66 with rollers (not visible here) arranged in the interior of a housing 116.

The drive unit 70 comprises an antenna 120 and a control unit 122, in order to control the drive unit 70 in a manner known per se by means of contactless data transmission, for example by means of radio or inductive communication. The energy supply of the drive unit 70 is effected via track conductors 124a and 124b fed with alternating current and mounted laterally along the guide rail 66. The track conductors 124a and 124b comprise a winding extending to form a long conductor loop, which winding describes a loop with the track conductor 124a as the feed line and the track conductor 124b as the return line. The energy transfer takes place via a coil 126 on the drive unit 70 which is arranged in direct proximity to the track conductors 124a, 124b, without touching same.

As can be seen in particular in FIG. 3 and FIG. 4, the drive unit 70 engages in the guide rail 66, on the side opposite the antenna 120, the control unit 122 and the coil 126, by means of three pressure rollers 128 which each form a compact unit with a hub drive (only one of which is provided with the reference numeral 128 in the Figures). The pressure rollers 128 are disposed parallel to the transport plane and are each rotatable about an axis perpendicular thereto.

The drive unit 70 is prevented from deviating laterally or tilting by lateral guide rollers (not visible here) which bear against the rail 66 on the opposite side, below the track conductors 124a, 124b.

The pressure rollers 128 are activated by means of the control unit 122, the drive unit 70 moving along the guide rail 66 as a result of the frictional engagement of the pressure rollers 128 with the guide rail 66.

In the present exemplary embodiment a position code strip, which includes bar codes readable by means of a read sensor, is also mounted on this side of the guide rail 66. The drive unit 70 carries a correspondingly positioned read sensor. In this way the absolute position of each corresponding drive unit 70 within the conveying installation 10 can be determined, whereby the position of a skid 12 moved thereby can also be detected. Alternative measures for detecting the position of the drive unit 70 and/or the skid 12, as known per se, are also possible.

Buffer elements 130 of elastic material are provided on the respective ends of the drive unit 70.

As explained above, a plurality of separate drive units 70, together with the guide rail 66, form a drive system 64. In a modification of this drive system 64, the guide rail 66 is omitted and the drive unit 70 moves on the floor of the installation without rail guidance. This is indicated in FIG. 15, where steerable rollers in contact with the floor and driven by means of a hub drive are accommodated in the housing 116 and cannot be seen. In this case the drive unit 70 includes a control unit 132 which meets the requirements of drive systems which are not track-bound, as known per se.

In a freely mobile system of this kind, the direction of movement can be specified, for example, by means of a metal wire recessed in the floor which is sensed inductively with a coil. In this case the control unit 132 of the freely mobile drive unit 70 corrects the actual direction in conformity with the reference direction of the drive unit 70. In another possibility, the drive unit 70 may navigate entirely autonomously, for which purpose suitable control technology, known per se, is provided.

As mentioned above, a drive unit 70 is coupled to a skid 12 via a coupling device 72, so that a skid 12 coupled to the drive unit 70 follows the movement of the drive unit 70, for example along the guide rail 66.

Figure 16A:
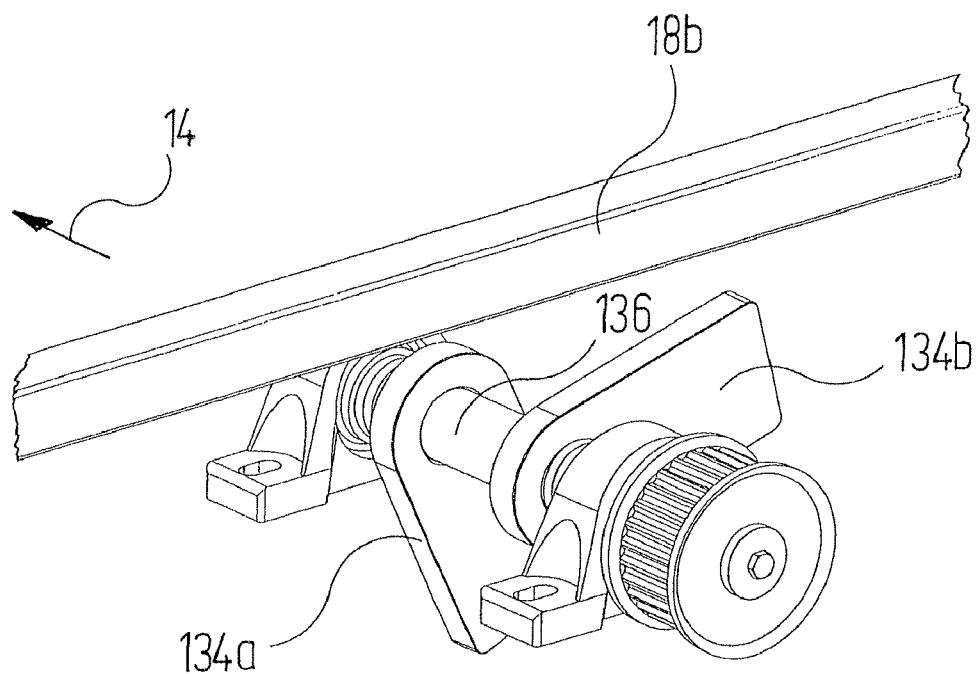
FIGS. 16A, 16B and 16C are perspective representations of a coupling mechanism for coupling the separate drive unit to the skid, two paddles being shown in a first, second and third position.
Figure 16B:
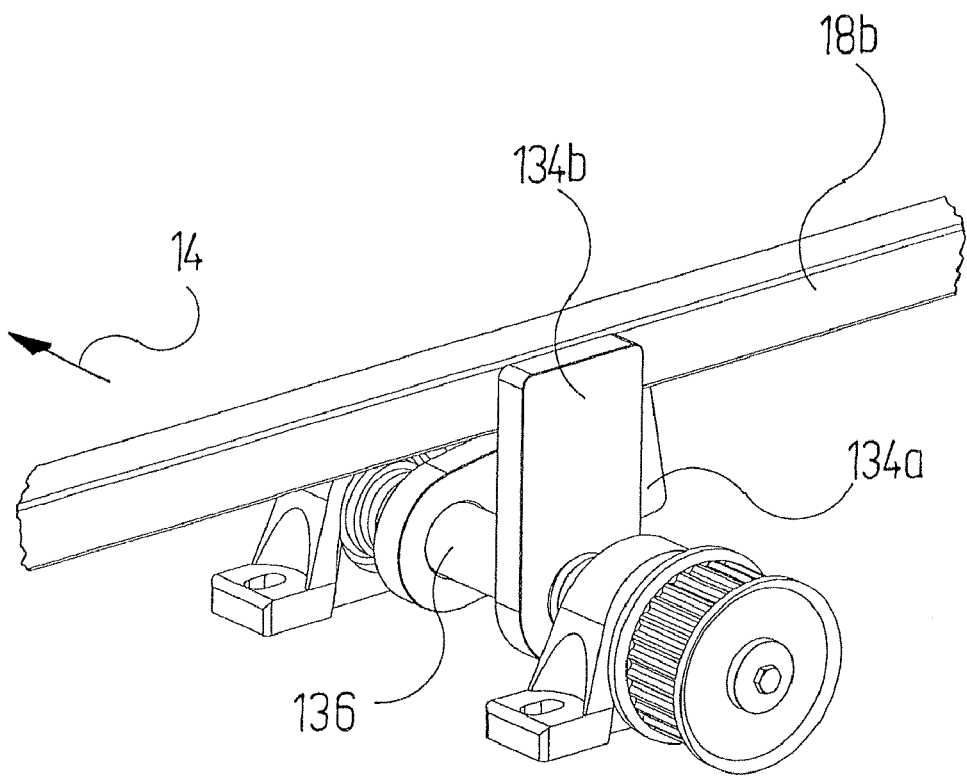
Figure 16:
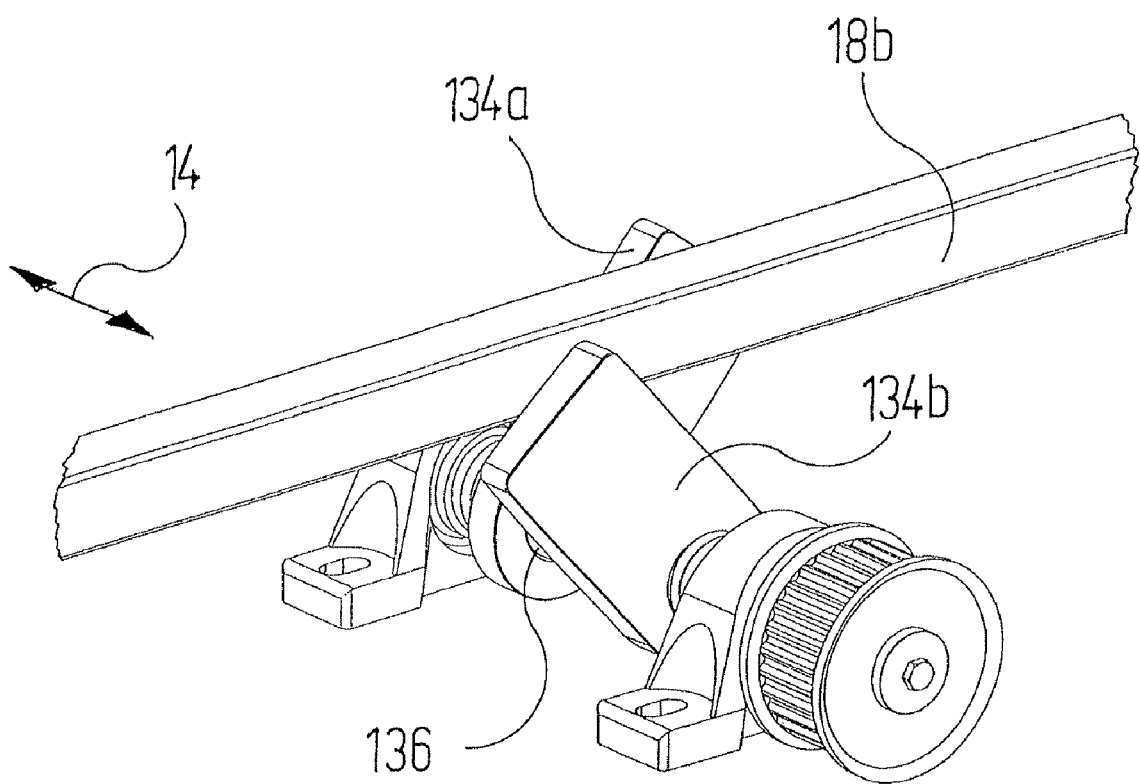

An exemplary embodiment of a coupling device 72 is shown in FIGS. 16A, 16B and 16C. The coupling device 72 of the drive unit 70 includes as catch elements two substantially rectangular flat paddles 134a, 134b which are each connected rigidly at one end to a spindle 136 which extends perpendicularly to the flat paddle surface of the paddles 134a, 134b. The paddles are arranged at an angle of 80° to one another on the spindle 136 at a distance such that the middle cross-member 18b of the skid 12 can be accommodated between the two paddles 134a, 134b. The face of each paddle 134a, 134b which is to engage the cross-member 18b of the skid 12 is a catch face.

The spindle 136 of the coupling device 72 is connected to a controllable electric motor, so that the paddles 134a, 134b can be swivelled in a specified manner around the spindle 136 and can be held in a desired position.

For the operation of the drive unit 70, three positions of the paddles 134a, 134b, which are represented in FIGS. 16A, 16B and 16C, are of particular importance.

In a first position (cf. FIG. 16A) the paddles 134a, 134b occupy a position in which the drive unit 70 can pass below a skid 12 without a paddle 134a, 134b being able to engage the cross-member 18b of the skid 12, which cross-member 18b is arranged somewhat lower than the two other cross-members 18a and 18c.

In a second position (FIG. 16B) the rear paddle of the paddles 134a, 134b, viewed in the direction of travel 14—in FIG. 16B this is the paddle 134b—adopts a position in which its free end is at the height of the cross-member 18b of the skid 12, whereas the other paddle—here the paddle 134a—can pass below the cross-member 18b of the skid 12 without contact. If the drive unit 70 passes under a skid 12 with the coupling device 72 set in this way, it entrains the skid 12 in its direction of travel when the corresponding paddle 134b abuts the cross-member 18b of the skid 12. To alleviate the resulting shock loading, dampers (not shown here) are provided on the paddles 134a, 134b. Alternatively the paddles 134a, 134b may be retained resiliently on the spindle 136.

In a third position (cf. FIG. 16C) the two paddles 134a, 134b are at an angle of approximately 50° to the cross-member 18b of the skid 12 and accommodate the latter between them.

Because the paddles 134a, 134b accommodate the cross-member 18b of the skid 12 between them, the skid 12 can also follow a change of travel direction of the drive unit 70 and, in addition, can be braked and brought to a standstill in a specified manner.

After a braking operation the corresponding skid 12 can be detached from the drive unit 70 in that the first or second position of the paddles 134a, 134b, explained above, is set, whereby the drive unit detached from the skid 12 can pass below the skid 12 in one or both directions.

As can be seen in FIG. 1, straight sections of the guide rail 66 of the drive systems 64 can be connected to one another by a curved section 66a. The drive unit 70 can follow the curve on this section of the drive rail 66 on a curved path. A skid 12 entrained by the drive unit 70 can also move around a curve because of the swivellability of the running wheels 32a, 32b about the longitudinal axis of the associated pivoted members 34a, 34b, and can therefore follow a drive unit 70 on the curved section 66a of the guide rail 66 without rail sections 62 being needed to guide the running wheels 32a, 32b.

Each of the drive units 70 of the drive system 64 can be activated individually, so that individual moving of skids 12 inside the buffer area 56 is possible.

In addition, the possibility is provided that individual drive units 70 can move out of the guide rail 66 in the buffer area 56 and can be driven on a separate stretch of track 138 to a different area of use.

For this purpose transverse conveying rails 140, on which a drive unit 70 can be driven out of or into the buffer area 56, are provided transversely to the straight sections of the guide rail 66. Transverse travel between the two straight sections of the guide rail 66 in the buffer area 56 is also possible.

When travelling transversely, a corresponding drive unit 70 picks up a removable rail segment 68 and carries it with it, as is known per se in transverse conveyor systems.

As was explained above, skids 12 are conveyed outside the buffer area by means of a roller conveyor 46, for which purpose the latter includes driven transport rollers 54. However, treatment stations for vehicle bodies exist in which conditions prevail which cannot be tolerated by drives such as the hub drives used for driving the driven transport rollers 54 of the roller conveyor 46.

Figure 17:
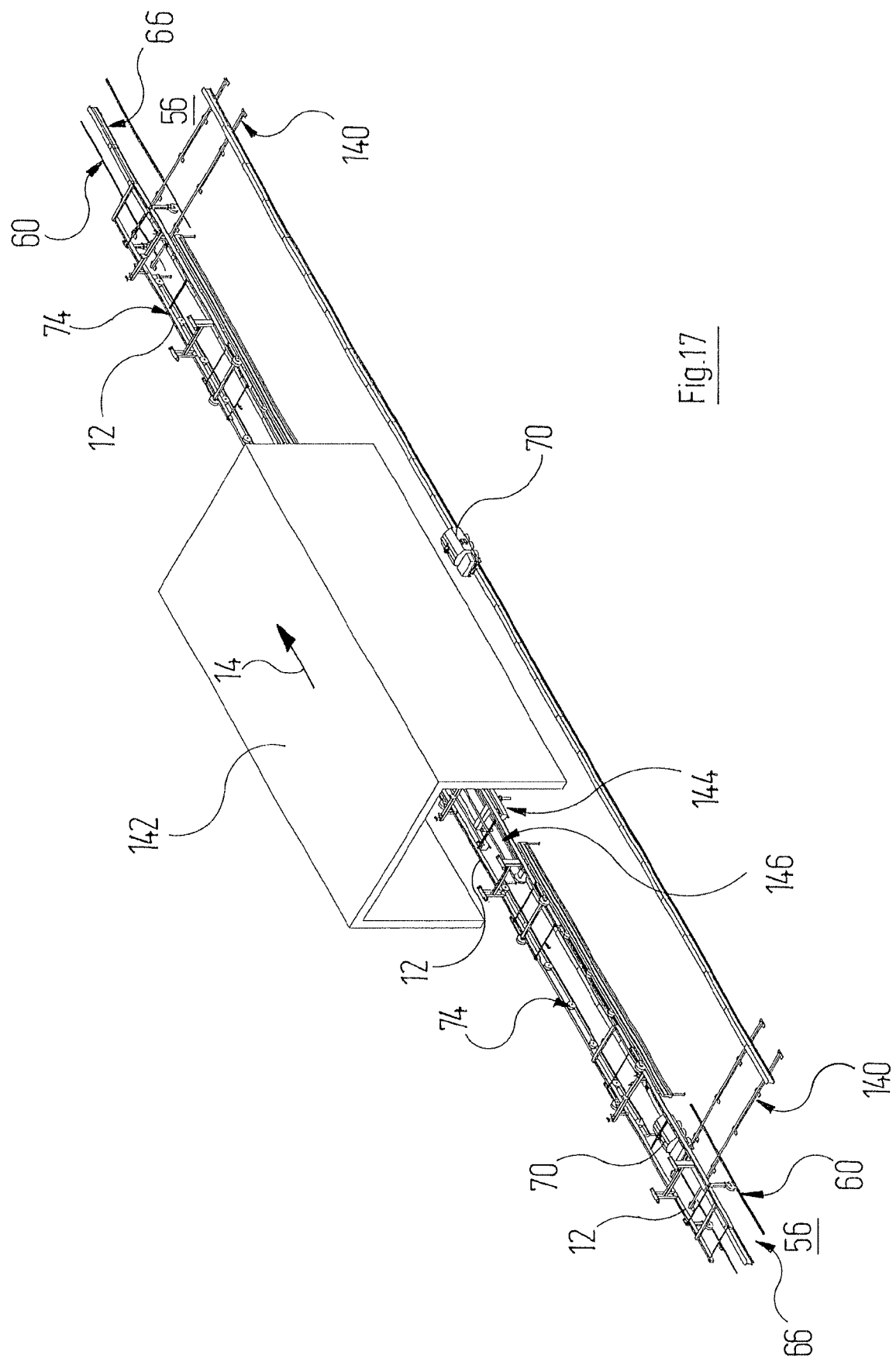
FIG. 17 is a perspective representation of a first exemplary embodiment of a treatment station of the conveyor installation of FIG. 1 in the form of a drier inside which the skid is guided on support runners on a roller track with its running wheels in the rest position; and, FIG. 18 is a perspective representation of a further exemplary embodiment of the drier of FIG. 17, the skid running on the floor with its running wheels in their operating position.
Figure 18:
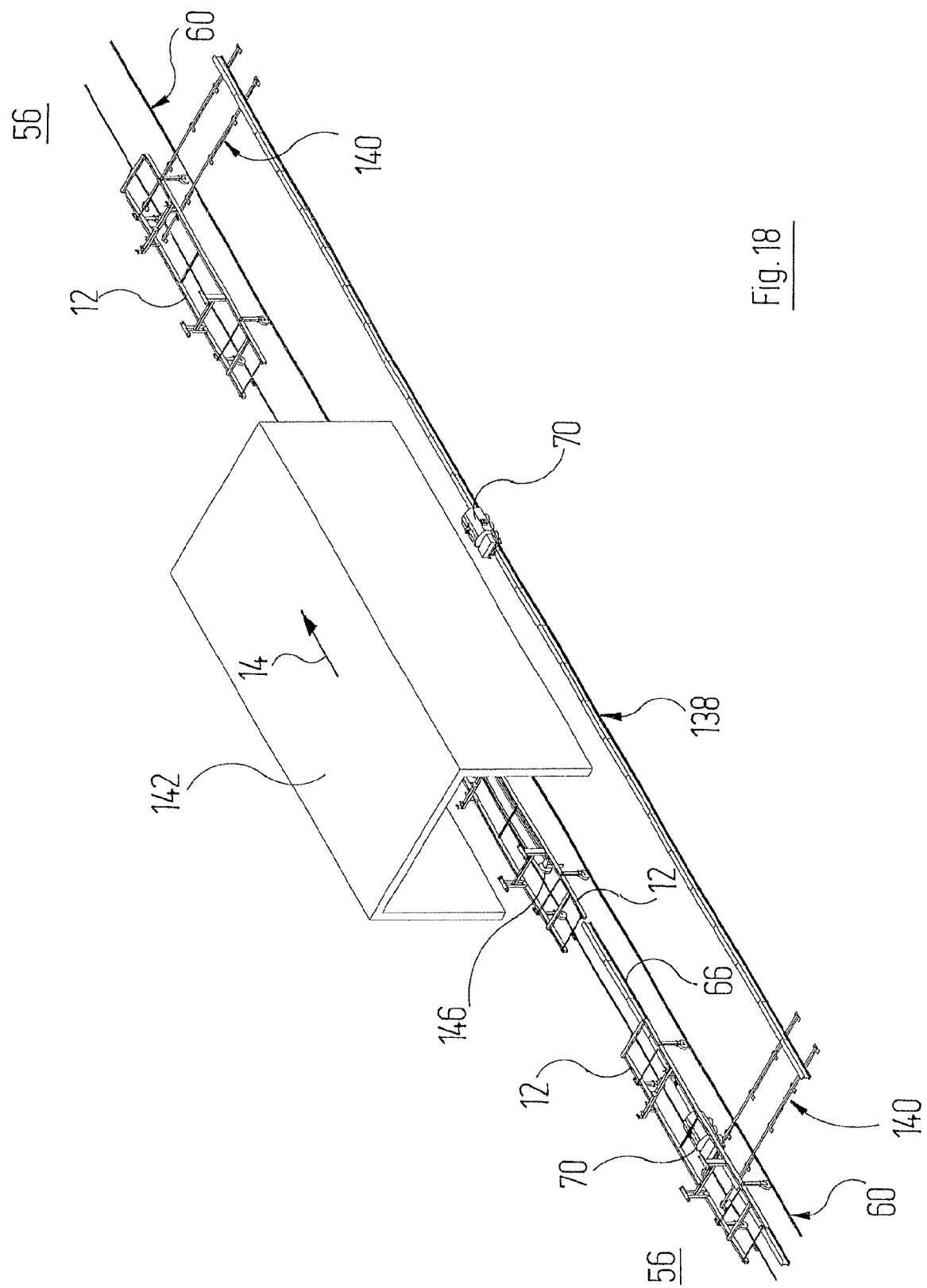

Such treatment stations include, for example, a drier 142, as indicated in FIGS. 17 and 18. In order to convey a skid 12 through such a treatment station there is provided inside the drier 142, in a first exemplary embodiment shown in FIG. 17, a roller track 144 which corresponds substantially to the roller conveyor 46, except that it comprises only non-driven transport rollers 52.

For driving a skid 12 on the roller track 144 a traction device 146, which is largely impervious to the conditions prevailing in the drier 142, is disposed midway between the roller rails 48 of said roller track 144, the traction device 146 being, for example, in the form of a steel cable circulating on rollers or a circulating chain with catch elements which engage the skid 12, for example on its cross-member 18b, and convey the skid 12 through the drier 142 on the roller track 144.

In the embodiment according to FIG. 17, a transfer station 74a is provided ahead of the roller track 144, viewed in the conveying direction 14, by means of which transfer station 74a the skid 12 coming from the buffer area 56 in the manner described above is transferred to the roller track 144. This means that the skid 12 is moved on the roller track 144 with the running gear assemblies 44a, 44b in their rest position. At the opposite end of the drier 142 there is provided a transfer station 74b, adjoining which is a further buffer area 56 with floor rails 60 for the skids 12 and drive units 70 running on a guide rail 66, which buffer area 56 leads to a further treatment station.

In a further exemplary embodiment shown in FIG. 18, no transfer stations 74 are provided before and after the drier 142. Rather, the floor rails 60, emerging from a buffer area 56 arranged before the drier 142, viewed in the conveying direction 14, run through the drier 142 without interruption and lead on the other side of the drier 142 into a further buffer area 56. The guide rail 66 of the drive system 64 is not provided in the region of the drier 142. The skid is conveyed inside the drier 142 by means of the traction device 146, as in the exemplary embodiment according to FIG. 17.

In this case, unlike that of the exemplary embodiment according to FIG. 17, the skid 12 runs inside the drier 142 on its running wheels 32a, 32b, for which purpose the running gear assemblies 44a, 44b of the corresponding skid 12 remain in their operating position, which they adopted in the buffer area 56 before entering the drier 142.

In FIGS. 17 and 18 a possible application of the above-described transverse conveyor system with the transverse conveying rails 140 is also indicated, by way of example in both cases. When the skid 12, driven by means of the drive unit 70, enters the buffer area 56, the corresponding drive unit 70 can be driven beside the drier area 142 via the transverse conveying rail 140, and past the drier 142 via the separate rail section 138. The drive unit 70 can then be driven back into the travel path of the skid 12 downstream of the drier 142, viewed in the conveying direction 14, by means of further transverse conveying rails 140, in order to propel the skid 12 into the buffer area 56 located after the drier.

In a modification of the above-described conveyor installation 10, the roller conveyor 46 may be replaced by a roller conveyor which has only non-driven rollers, conveyance of the skid 12 also being effected in the area of this roller conveyor without driven rollers by means of the drive unit 70. For this purpose the drive unit 70 can pass underneath the roller conveyor without drive rollers. If the rail-guided drive unit 70 is used, a guide rail 66, on which the drive unit 66 can be driven, is also disposed correspondingly underneath the roller conveyor without drive rollers.

In a further modification, such a roller conveyor which has only non-driven rollers is additionally provided in a buffer area 56 of the conveyor installation 10. In this case the conveyor installation can also be operated with a skid which does not have running means different from the support runners, that is, a skid which is known per se. For this purpose, such a known skid must simply be retrofitted with a retaining means for the coupling device 72 of the drive unit 70, for example in the form of a cross-member corresponding to the cross-member 18b of the skid 12. In this modification of the conveyor installation 10, transfer stations 74 may be omitted.

It is again emphasized that the above-described embodiments of the present invention, particularly, any "preferred" embodiments, are possible examples of implementations merely set forth for a clear understanding of the principles of the invention. Many variations and modifications may be made to the above-described embodiments of the invention without substantially departing from the spirit and principles of the invention. All such modifications are intended to be included herein within the spirit of the invention and the scope of protection is only limited by the accompanying claims.

What is claimed is:

1. A skid for supporting at least one object, which is conveyable in a conveying direction inside a conveyor installation, comprising:
    at least two support runners disposed parallel to one another which cooperate with conveyor means within the conveyor installation, wherein running means different from the support runners are fastened to the skid and, are adjustable between a rest position and an operating position, wherein the running means, in the operating position, cooperate with a floor; and, wherein the at least one object comprises a vehicle body.

2. The skid of claim 1, wherein the running means is arranged below the support runners in operation.

3. The skid of claim 1, wherein the running means is in the form of a plurality of running wheels on which the skid can be driven.

4. The skid of claim 3, wherein each running wheel is mounted to an end region of a pivoted member which is mounted swivellably to the skid in its opposite end region.

5. The skid of claim 4, wherein the pivoted member is mounted swivellably to the skid about an axis running perpendicularly to the conveying direction and parallel to a plane defined by the support runners.

6. The skid of claim 4, wherein at least one running gear assembly is provided which includes two pivoted members with respective associated running wheels forming the running means, the two pivoted members of the running gear assembly being connected rigidly to one another.

7. The skid of claim 3, wherein the axle of at least one running wheel is rotatable in its operating position about an axis which is disposed perpendicularly to a plane defined by the support runners.

8. The skid of claim 3, wherein at least one latching device for at least one running wheel is provided, by means of which the corresponding running wheel can be locked selectively in its rest position or in its operating position.

9. The skid of claim 1, wherein viewed in the conveying direction, a part of a coupling device is provided at each end of the skid, so that a plurality of skids are connectable detachably to form a combination in which the skids are arranged one behind the other in the conveying direction.

* * * * *